(12) United States Patent
Lee

(10) Patent No.: US 12,334,793 B2
(45) Date of Patent: Jun. 17, 2025

(54) ACTUATOR FOR CAMERA

(71) Applicant: SAMSUNG ELECTRO-MECHANICS CO., LTD., Suwon-si (KR)

(72) Inventor: Kyung Hun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 222 days.

(21) Appl. No.: 18/316,598

(22) Filed: May 12, 2023

(65) Prior Publication Data

US 2023/0387773 A1 Nov. 30, 2023

(30) Foreign Application Priority Data

May 31, 2022 (KR) .................. 10-2022-0067178
Mar. 8, 2023 (KR) .................. 10-2023-0030714

(51) Int. Cl.
| | |
|---|---|
| *H02K 41/035* | (2006.01) |
| *G03B 30/00* | (2021.01) |
| *H02K 11/215* | (2016.01) |
| *H04N 23/54* | (2023.01) |
| *H04N 23/68* | (2023.01) |

(52) U.S. Cl.
CPC ....... *H02K 41/0354* (2013.01); *H02K 11/215* (2016.01); *H04N 23/54* (2023.01); *H04N 23/687* (2023.01); *G03B 30/00* (2021.01)

(58) Field of Classification Search
CPC .......... H02K 41/0356; H02K 41/0354; H02K 11/215; H04N 23/687; H04N 23/54; H04N 23/55; H04N 23/57; G03B 3/10; G03B 30/00

USPC ....................................... 348/208.7
See application file for complete search history.

(56) References Cited

U.S. PATENT DOCUMENTS

| | | | |
|---|---|---|---|
| 10,890,734 B1* | 1/2021 | Sharma | H02P 6/30 |
| 11,683,455 B2* | 6/2023 | MacKinnon | H04N 23/55 |
| | | | 348/208.99 |
| 11,910,090 B2* | 2/2024 | Kwon | G02B 7/09 |
| 11,956,544 B2* | 4/2024 | Mahmoudzadeh | H04N 23/687 |
| 2011/0013283 A1* | 1/2011 | Sato | G02B 27/646 |
| | | | 359/557 |

(Continued)

FOREIGN PATENT DOCUMENTS

| | | |
|---|---|---|
| KR | 10-2018-0116965 A | 10/2018 |
| KR | 10-2019-0061439 A | 6/2019 |

(Continued)

OTHER PUBLICATIONS

Korean Office Action issued on Dec. 30, 2024 in corresponding Korean Patent Application No. 10-2023-0030714. (6 pages in English and 5 pages in Korean).

*Primary Examiner* — Pritham D Prabhakher
(74) *Attorney, Agent, or Firm* — NSIP Law

(57) ABSTRACT

An actuator for a camera includes a housing having an internal space; a first carrier accommodated in the housing; a second carrier accommodated in the first carrier; and an image sensor fixed relative to the second carrier, wherein the first carrier and the second carrier are configured to move together in a direction parallel to an imaging plane of the image sensor, and wherein the second carrier is configured to move relative to the first carrier in a direction perpendicular to the imaging plane of the image sensor.

31 Claims, 24 Drawing Sheets

(56) References Cited

U.S. PATENT DOCUMENTS

| | | | |
|---|---|---|---|
| 2015/0049209 A1* | 2/2015 | Hwang | G02B 7/09 |
| | | | 348/208.11 |
| 2015/0146025 A1 | 5/2015 | Bang et al. | |
| 2017/0108705 A1* | 4/2017 | Yu | G02B 7/09 |
| 2019/0384034 A1* | 12/2019 | Min | G03B 3/10 |
| 2020/0310079 A1 | 10/2020 | Park et al. | |
| 2021/0080806 A1* | 3/2021 | Xuepeng | G03B 3/10 |
| 2021/0132327 A1* | 5/2021 | Sharma | G02B 7/09 |
| 2021/0152789 A1* | 5/2021 | MacKinnon | H04N 25/709 |
| 2021/0409604 A1 | 12/2021 | Sharma | |
| 2022/0014677 A1* | 1/2022 | Smyth | G02B 7/09 |
| 2022/0247931 A1* | 8/2022 | Mahmoudzadeh | |
| | | | H02K 41/0356 |
| 2022/0353416 A1* | 11/2022 | Kwon | G02B 7/021 |

FOREIGN PATENT DOCUMENTS

| | | |
|---|---|---|
| KR | 10-2020-0116402 A | 10/2020 |
| KR | 10-2179952 B1 | 11/2020 |
| KR | 10-2020-0139109 A | 12/2020 |
| KR | 10-2022-0030723 A | 3/2022 |

* cited by examiner

II-II'

III-III'

ACTUATOR FOR CAMERA

CROSS-REFERENCE TO RELATED APPLICATIONS

This application claims the benefit under 35 USC 119(a) of Korean Patent Application No. filed on May 31, 2022, and Korean Patent Application No. 10-2023-0030714 filed on Mar. 8, 2023, in the Korean Intellectual Property Office, the entire disclosures of which are incorporated herein by reference for all purposes.

BACKGROUND

1. Field

The present disclosure relates to an actuator for a camera.

2. Description of the Background

Camera modules may be employed in mobile communication terminals such as a smartphone, a tablet PC, and a laptop computer.

Also, a camera module may include an actuator having a focus adjustment function and an optical image stabilization function to generate a high-resolution image.

For example, focus may be adjusted in an optical axis (Z-axis) direction, while image stabilization may be performed by moving the lens module in a direction perpendicular to the optical axis (Z-axis) direction.

However, as the performance of a camera module is improved, a weight of a lens module may be increased, and also, due to a weight of a driver for moving the lens module, driving force of focus adjustment and driving force of image stabilization may be difficult to precisely control.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an actuator for a camera includes a housing having an internal space, a first carrier accommodated in the housing, a second carrier accommodated in the first carrier, and an image sensor fixed relative to the second carrier, wherein the first carrier and the second carrier are configured to move together in a direction parallel to an imaging plane of the image sensor, and wherein the second carrier is configured to move relative to the first carrier in a direction perpendicular to the imaging plane of the image sensor.

The actuator may further include a first driver including a plurality of magnets and a plurality of coils, wherein the plurality of magnets may be disposed on the first carrier.

The first driver may include a first sub-driver including a first magnet and a first coil and a second sub-driver including a second magnet and a second coil, the first sub-driver may generate driving force in a direction in which the first magnet and the first coil face each other, and the second sub-driver may generate driving force in a direction in which the second magnet and the second coil face each other.

The first magnet may include a plurality of magnets spaced apart from each other in a first axis direction parallel to the imaging plane, and each of the plurality of magnets may have a length in a second axis direction perpendicular to the first axis direction and parallel to the imaging plane, and the first sub-driver may include a hall sensor disposed to face the first magnet.

The second magnet may include a plurality of magnets spaced apart from each other in a first axis direction parallel to the imaging plane, and each of the plurality of magnets may have a length in the first axis direction, and the second sub-driver may include a hall sensor disposed to face the second magnet.

The actuator may further include a first ball member disposed between the housing and the first carrier, wherein a guide groove on which the first ball member may be disposed may be provided on at least one of surfaces of the housing and the first carrier facing each other in a direction perpendicular to the imaging plane.

The actuator may further include a first driver including a plurality of magnets and a plurality of coils, wherein the plurality of magnets may be disposed on the first carrier, and a first yoke may be disposed in the housing to face the plurality of magnets in a direction perpendicular to the imaging plane.

A support pad may be disposed on a bottom surface of the guide groove, and a material of the support pad may be different from a material of the housing and a material of the first carrier.

The housing may include a plurality of damping grooves, and the first carrier may include a plurality of damping pins extending toward the plurality of damping grooves, and a damping gel may be disposed in the plurality of damping grooves, and at least a portion of each of the plurality of damping pins may be disposed in the damping gel.

The actuator may further include a second driver including a third magnet disposed on the first carrier and a third coil disposed on the second carrier.

A substrate may be disposed on the second carrier, and the third coil may be disposed on one surface of the substrate.

The actuator may further include a second ball member disposed between the first carrier and the second carrier, wherein the second ball member may include a first ball group and a second ball group spaced apart from each other in a direction parallel to the imaging plane, and wherein the first ball group may include two or more balls disposed in a direction perpendicular to the imaging plane, and the second ball group may include fewer balls than those of the first ball group.

A second yoke facing the third magnet may be disposed on the second carrier.

An auxiliary yoke may be disposed on an inner side of the third coil, and the auxiliary yoke may be disposed closer to the first ball group than to the second ball group.

The actuator may further include a sensor substrate including a moving portion on which the image sensor may be disposed, a fixed portion mounted on the housing, and a connection portion connecting the moving portion to the fixed portion, wherein the connection portion may extend along a circumference of the moving portion, and the moving portion may be coupled to the second carrier.

The connection portion may include a first support portion and a second support portion, the first support portion may have one side connected to the fixed portion and the other side spaced apart from the moving portion, and the second support portion may have one side connected to the moving portion and the other side spaced apart from the fixed portion.

The moving portion may include a through-hole penetrating through the moving portion in a direction perpendicular to the imaging plane, the image sensor may be disposed in the through-hole, and a reinforcement plate may be mounted on a lower surface of the moving portion.

A camera module may include the actuator, and a lens module coupled to the housing and fixed relative to the housing.

A portable electronic device may include a camera module including the actuator, and a lens module coupled to the housing.

In another general aspect, an actuator for a camera includes a housing, a first carrier accommodated in the housing, a second carrier accommodated in the first carrier, an image sensor fixed relative to the second carrier, a first driver including a first magnet and a second magnet disposed on the first carrier, and a first coil and a second coil disposed on the housing, and a second driver including a third magnet disposed on one of the first carrier and the second carrier, and a third coil disposed on the other of the first carrier and the second carrier, wherein the first carrier, the second carrier, and the second driver are configured to move together in a direction parallel to an imaging plane of the image sensor.

The second carrier may be configured to move relative to the first carrier in a direction perpendicular to the imaging plane of the image sensor.

The actuator may further include a sensor substrate including a moving portion on which the image sensor may be disposed, a fixed portion mounted on the housing, and a connection portion connecting the moving portion and the fixed portion, wherein the moving portion may be coupled to the second carrier.

The actuator may further include a first substrate disposed in the housing and a second substrate disposed in the second carrier, wherein the first substrate may be connected to the fixed portion, and the second substrate may be connected to the moving portion.

In another general aspect, an actuator for a camera includes a first carrier movable perpendicular to an optical axis, a second carrier disposed in the first carrier and movable in the optical axis direction relative to the first carrier, and an image sensor disposed on the second carrier, wherein the second carrier and the image sensor move with the first carrier when the first carrier moves, and wherein the image sensor moves with the second carrier when the second carrier moves in the optical axis direction.

The actuator may further include a first driver including first magnets facing first coils and second magnets facing second coils, wherein the first magnets may face the first coils and the second magnets may face the second coils in the optical axis direction or in a direction perpendicular to the optical axis direction.

The actuator may further include a housing, a pulling magnet disposed on the first carrier, and a first yoke disposed on the housing, wherein the first carrier may be disposed in the housing, and attractive force may act between the first yoke and the pulling magnet in the optical axis direction.

The actuator may further include a first ball member disposed between the housing and the first carrier, wherein a guide groove on which the first ball member may be disposed may be provided on at least one of surfaces of the housing and the first carrier facing each other in the optical axis direction, and the attractive force may maintain contact of the first ball member with the housing and the first carrier.

A camera module may include a housing, the actuator disposed in the housing, and a lens module coupled to the housing and fixed relative to the housing, wherein the first carrier and the second carrier may be movable relative to the housing.

A portable electronic device may include a camera module, which may include a housing, the actuator disposed in the housing, and a lens module coupled to the housing, wherein the first carrier and the second carrier may be movable relative to the housing.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
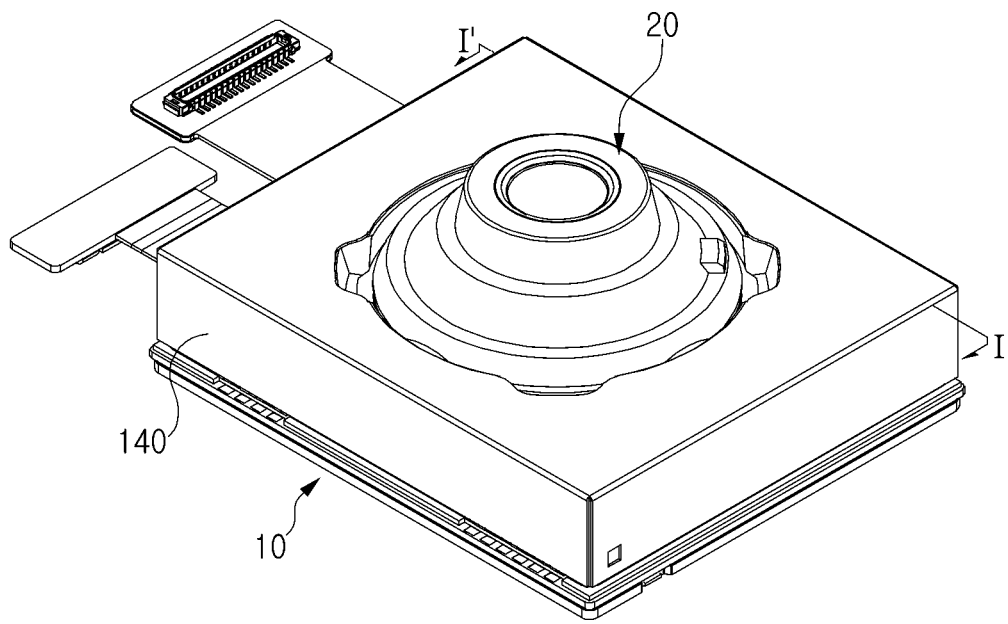
FIG. 1 is a perspective diagram illustrating a camera module according to an example embodiment of the present disclosure.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

A camera module according to example embodiments may be mounted on a portable electronic device. The portable electronic device may be a portable electronic device such as a mobile communication terminal, a smartphone, or a tablet PC.

In example embodiments, a direction in which an imaging plane of an image sensor S is directed may refer to the optical axis (Z-axis) direction.

In example embodiments, the configuration in which the image sensor S may move in a direction parallel to the imaging plane of the image sensor S may indicate that the image sensor S may move in a direction perpendicular to the optical axis (Z-axis).

Also, the first axis (X-axis) direction and the second axis (Y-axis) direction may be examples of two directions perpendicular to the optical axis (Z-axis) and intersecting each other, and in example embodiments, the first axis (X-axis) direction and second axis (Y-axis) direction may be two directions perpendicular to the optical axis (Z-axis) and intersecting each other.

One or more example embodiments of the present disclosure may provide an actuator for a camera which may improve performance of focus adjustment and image stabilization.

Figure 2:
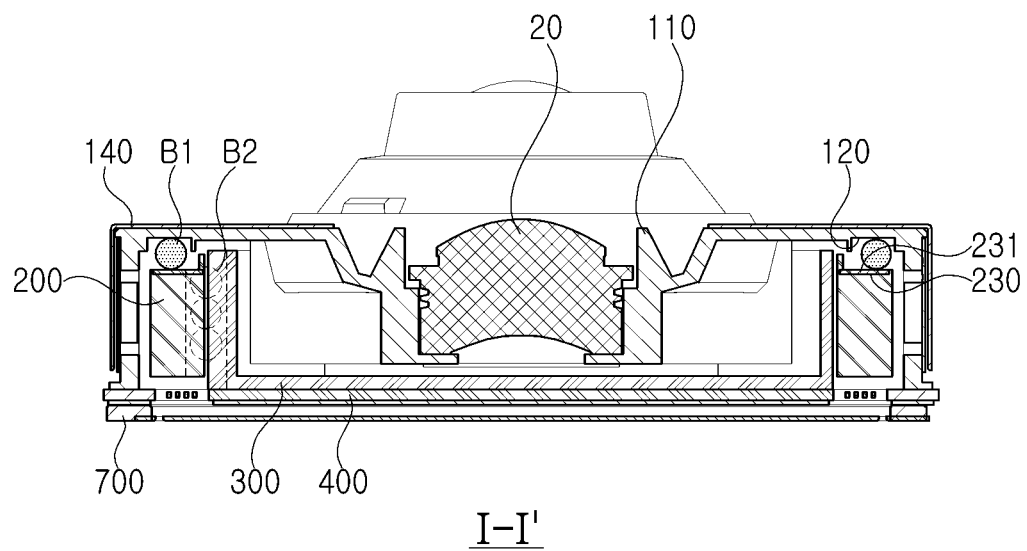
FIG. 2 is a cross-sectional diagram taken along line I-I' in FIG. 1.
Figure 3:
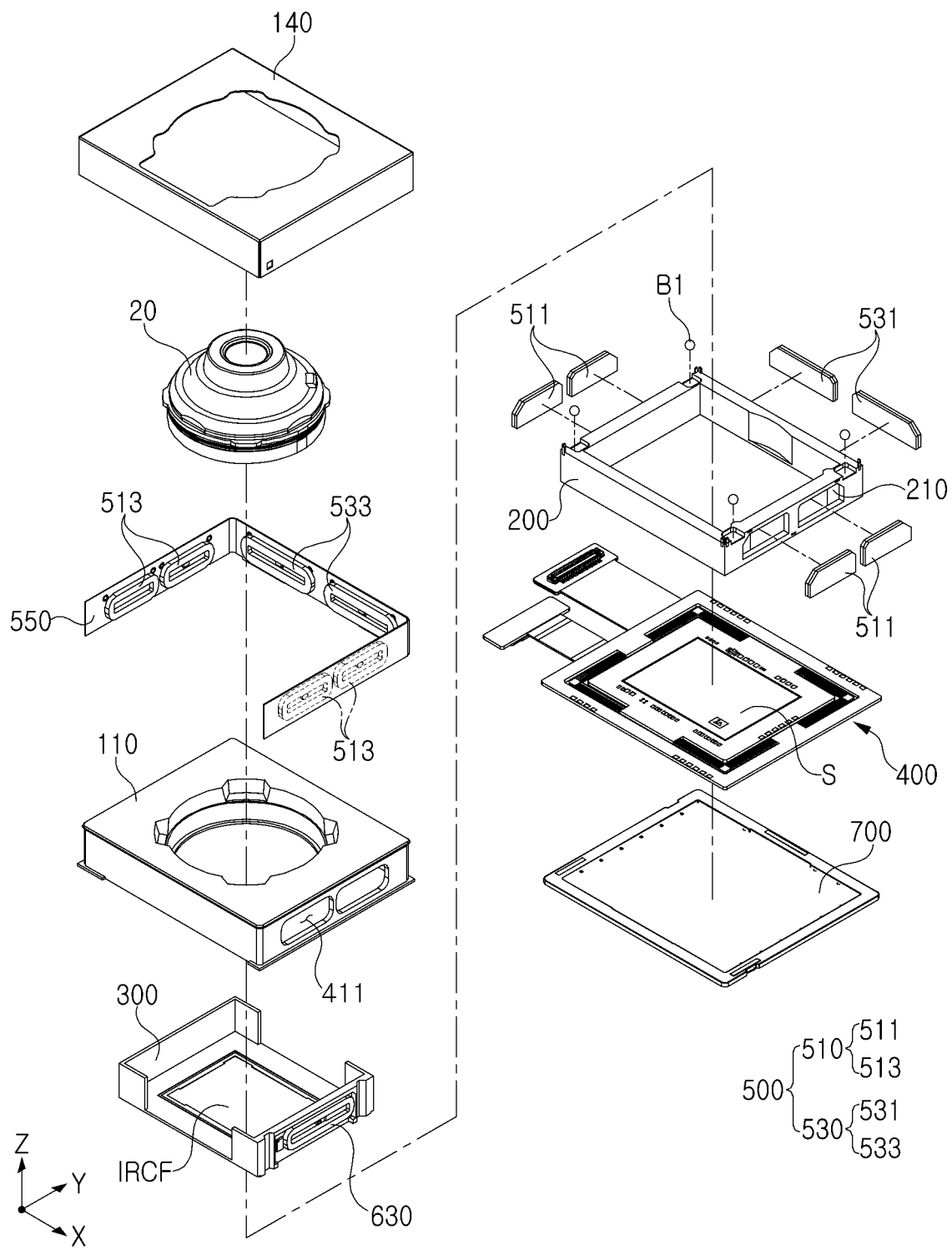
FIG. 3 is an exploded perspective diagram illustrating a camera module according to an example embodiment of the present disclosure.

FIG. 1 is a perspective diagram illustrating a camera module according to an example embodiment. FIG. 2 is a cross-sectional diagram taken along line I-I' in FIG. 1. FIG. 3 is an exploded perspective diagram illustrating a camera module according to an example embodiment.

Referring to FIGS. 1 to 3, a camera module 1 in an example embodiment may include a lens module 20 and an actuator 10 for a camera (hereinafter referred to as "actuator").

The lens module 20 may include one or more lenses and a lens barrel. One or more lenses may be disposed in the lens barrel. When a plurality of lenses are provided, a plurality of lenses may be mounted in the lens barrel along the optical axis (Z-axis).

The lens module 20 may be coupled to the housing 110. The housing 110 may have a square box shape having a hollow portion penetrated in the optical axis (Z-axis) direction, and the lens module 20 may be inserted into a hollow portion of the housing 110 and may be fixed to the housing 110.

In an example embodiment, the lens module 20 may be a fixed member fixed to the housing 110. For example, the lens module 20 may be a fixed member not moving during autofocusing (AF) and optical image stabilization (OIS).

The camera module 1 in an example embodiment may perform autofocusing (AF) and optical image stabilization (OIS) by moving an image sensor S rather than a lens module 20. Since the image sensor S having a relatively light weight moves, the image sensor S may move with a smaller driving force. Accordingly, the components included in the actuator 10 may be miniaturized.

The actuator 10 may include a housing 110, a first carrier 200 and a second carrier 300.

The first carrier 200 may be accommodated in the housing 110 and may move in a direction perpendicular to the optical axis (Z-axis) with respect to the housing 110. That is, the first carrier 200 may be a fixed member not moving in the optical axis (Z-axis) direction during focus adjustment, and may be a moving member moving in a direction perpendicular to the optical axis (Z-axis) during optical image stabilization.

The second carrier 300 may be accommodated in the first carrier 200 and may move in the optical axis (Z-axis) direction with respect to the first carrier 200. Also, since the second carrier 300 is constrained such that the second carrier 300 may not move relative to the first carrier 200 in a direction perpendicular to the optical axis (Z-axis), when the first carrier 200 moves in a direction perpendicular to the optical axis (Z-axis), the second carrier 300 may move along with the first carrier 200 in a direction perpendicular to the optical axis (Z-axis).

The image sensor S may be fixed with respect to the second carrier 300 to move together with the second carrier 300.

Accordingly, the image sensor S may move in the optical axis (Z-axis) direction together with the second carrier 300 and may adjust the focus, and the image sensor S may move in the optical axis (Z-axis) direction together with the second carrier 300 and may perform optical image stabilization while capturing images.

An infrared cut filter (IRCF) may be mounted on the second carrier 300.

The actuator 10 may further include a case 140. The case 140 may be configured to protect internal components of the actuator 10 by being coupled to the housing 110.

The image sensor S may be mounted on the sensor substrate 400. A portion of the sensor substrate 400 may be coupled to the second carrier 300, and the other portion of the sensor substrate 400 may be coupled to the housing 110.

An image sensor S may be mounted on a portion of the sensor substrate 400 coupled to the second carrier 300.

Since a portion of the sensor substrate 400 may be coupled to the second carrier 300, as the second carrier 300 moves, a portion of the sensor substrate 400 may also move along with the second carrier 300.

Accordingly, the image sensor S may move in the optical axis (Z-axis) direction and may adjust the focus, and may move in the direction perpendicular to the optical axis (Z-axis) and may perform optical image stabilization while photographing.

Figure 4:
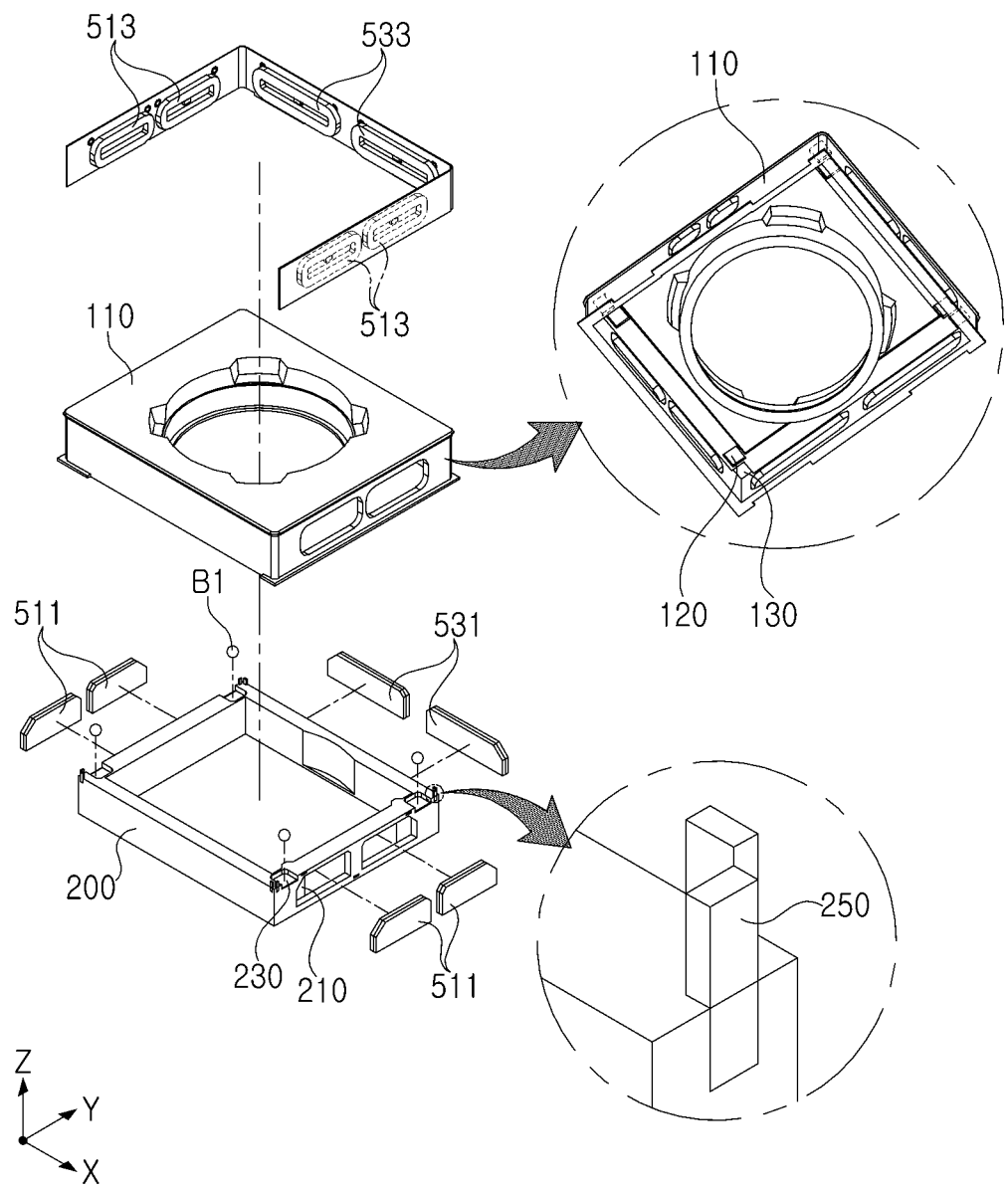
FIG. 4 is a perspective diagram illustrating a housing, a first carrier and a first driver according to an example embodiment of the present disclosure.
Figure 5:
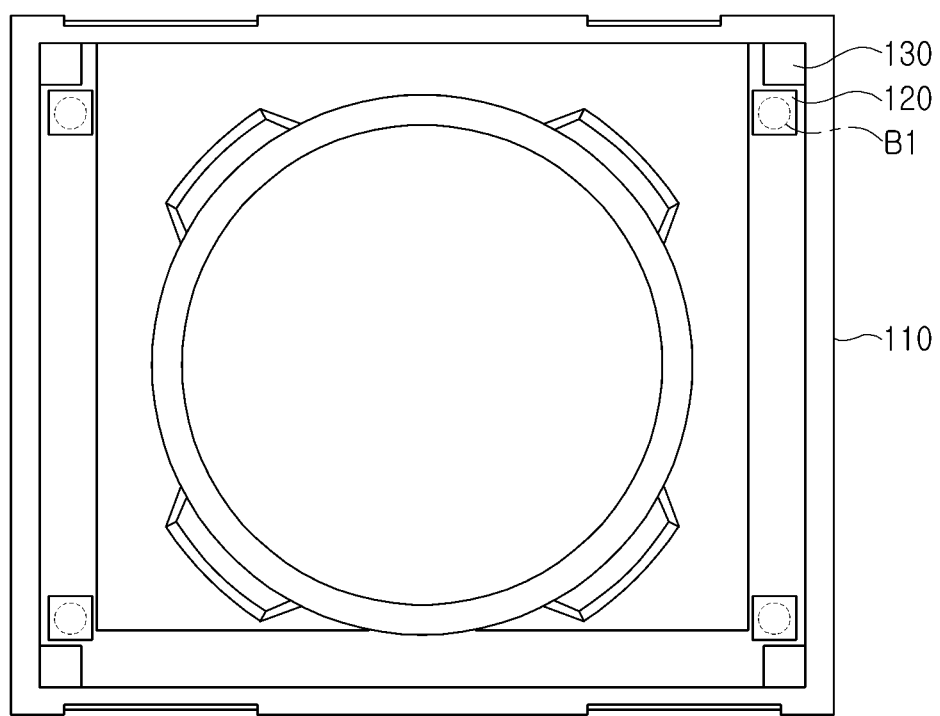
FIG. 5 is a diagram illustrating a housing according to an example embodiment of the present disclosure, viewed from below.
Figure 6:
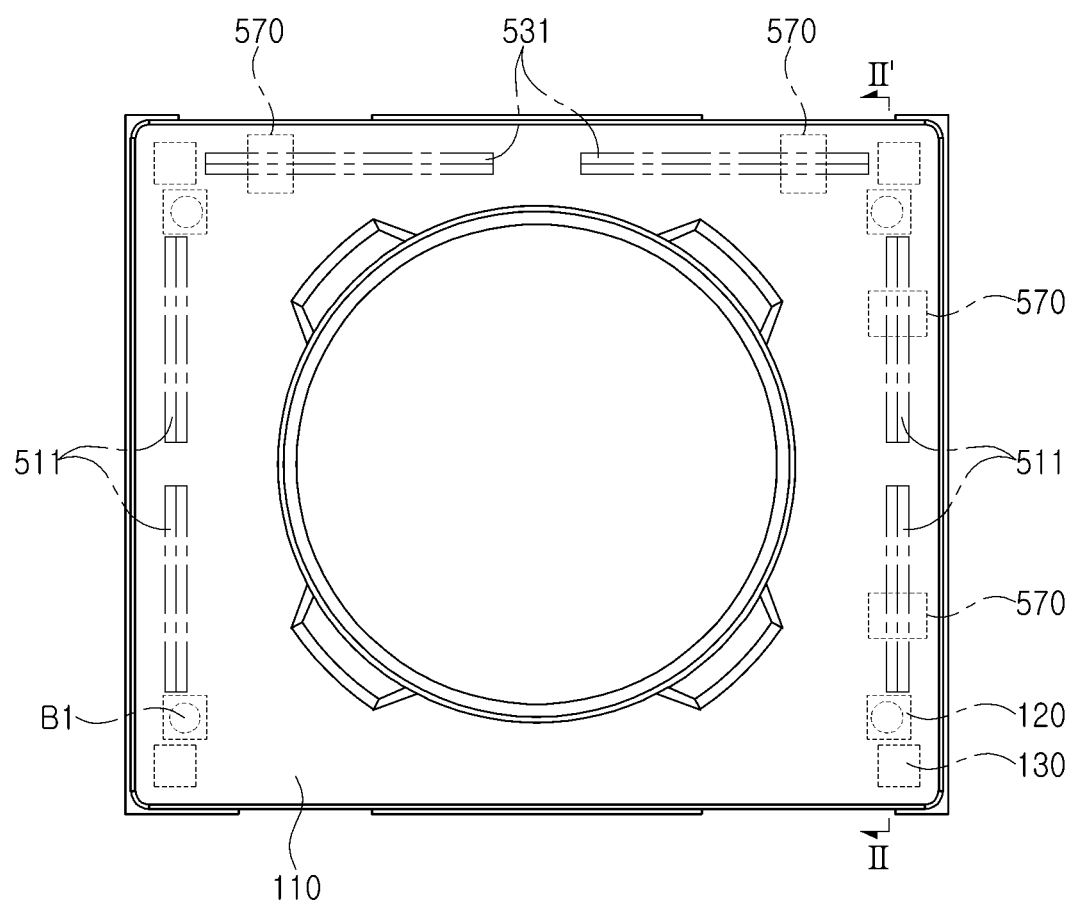
FIG. 6 is a plan diagram illustrating a state in which the components illustrated in FIG. 4 are coupled to each other.

FIG. 4 is a perspective diagram illustrating a housing, a first carrier and a first driver according to an example embodiment. FIG. 5 is a diagram illustrating a housing according to an example embodiment. FIG. 6 is a plan diagram illustrating a state in which the components illustrated in FIG. 4 are coupled to each other.

Figure 7:
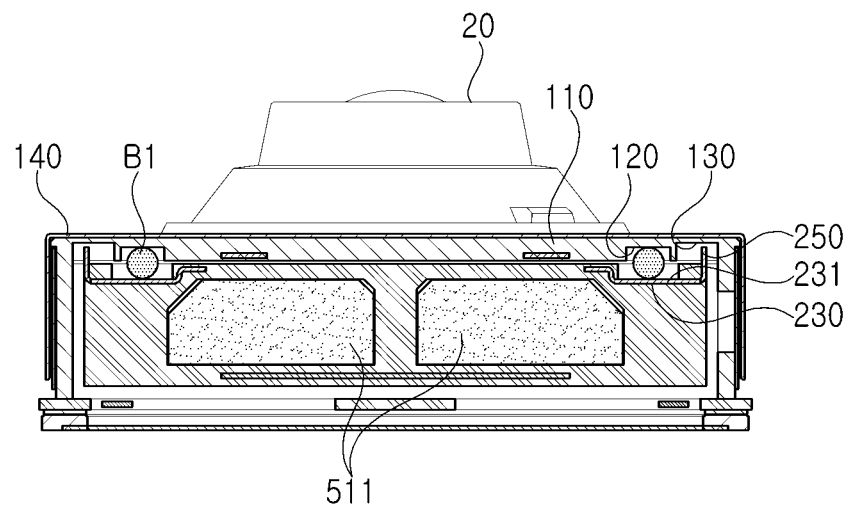
FIG. 7 is a cross-sectional diagram taken along line II-II' in FIG. 6.
Figure 8:
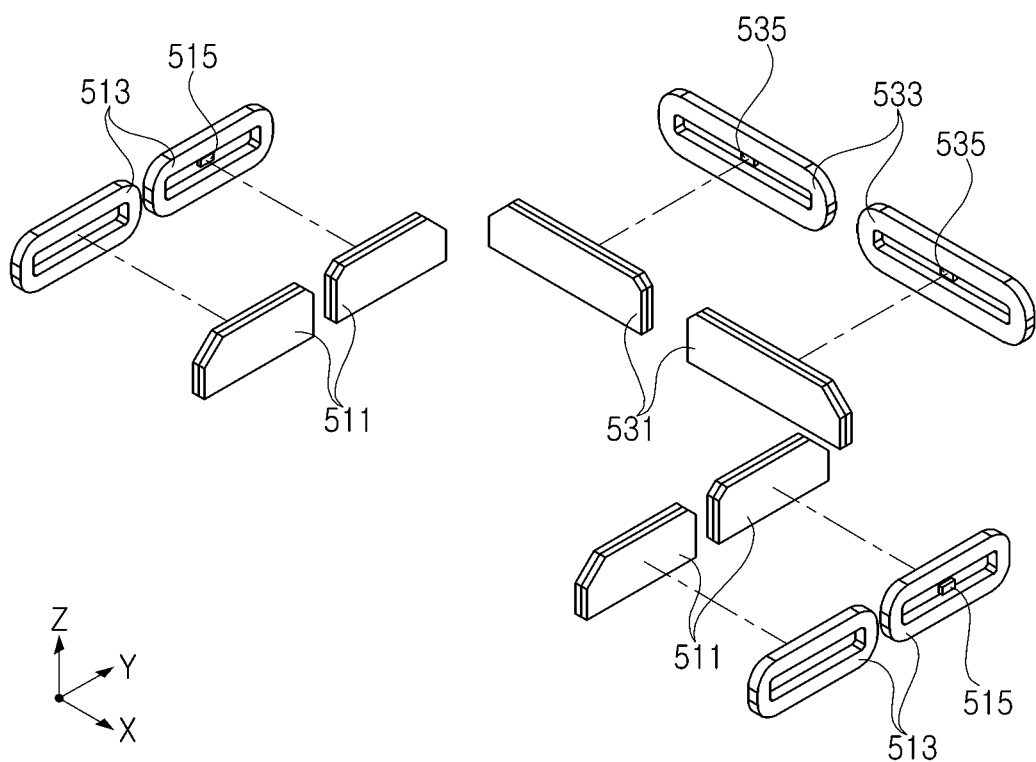
FIG. 8 is a perspective diagram illustrating a first driver according to an example embodiment of the present disclosure.

FIG. 7 is a cross-sectional diagram taken along line II-II' in FIG. 6. FIG. 8 is a perspective diagram illustrating a first driver according to an example embodiment.

Referring to FIGS. 4 to 8, the first carrier 200 may be disposed in the housing 110. In the housing 110, the first carrier 200 may move relative to the housing 110 in the first axis (X-axis) direction and the second axis (Y-axis) direction.

The first axis (X-axis) direction may refer to a direction perpendicular to the optical axis (Z-axis), and the axis (Y-axis) direction may refer to a direction perpendicular to both the optical axis (Z-axis) direction and the first axis (X-axis) direction.

The actuator 10 in an example embodiment may include a first driver 500. The first driver 500 may generate driving force in a direction perpendicular to the optical axis (Z-axis) and may move the first carrier 200 in a direction perpendicular to the optical axis (Z-axis).

The first driver 500 may include a first sub-driver 510 and a second sub-driver 530. The first sub-driver 510 may generate driving force in the first axis (X-axis) direction, and the second sub-driver 530 may generate driving force in the second axis (Y-axis) direction.

The first sub-driver 510 may include a first magnet 511 and a first coil 513. The first magnet 511 and the first coil 513 may face each other in a direction perpendicular to the optical axis (Z-axis).

The first magnet 511 may be disposed on the first carrier 200. For example, a first magnet 511 may be mounted on a side surface of the first carrier 200. A mounting groove 210 on which a first magnet 511 is mounted may be provided on a side surface of the first carrier 200. By inserting the first magnet 511 into the mounting groove 210, the sizes of the actuator 10 and the camera module 1 may be prevented from increasing due to the thickness of the first magnet 511.

The first magnet 511 may be magnetized such that one surface (e.g., a surface facing the first coil 513) may have an N pole or an S pole. For example, when one surface of the first magnet 511 facing the first coil 513 has an N pole, the other surface of the first magnet 511 (e.g., the opposite surface of the one surface) may be magnetized to have an S pole.

The first coil 513 may be disposed to face the first magnet 511. For example, the first coil 513 may be disposed to face the first magnet 511 in a direction perpendicular to the optical axis (Z-axis). The first coil 513 may have a donut shape having a hollow shape and a shape having a length in the second axis (Y-axis) direction.

The first coil 513 may be disposed on the first substrate 550. The first substrate 550 may be mounted on the housing 110 such that the first magnet 511 and the first coil 513 may face each other in a direction perpendicular to the optical axis (Z-axis).

A through-hole 411 may be provided in the housing 110. For example, the through-hole 411 may penetrate through the side surface of the housing 110 in a direction perpendicular to the optical axis (Z-axis). The first coil 513 may be disposed in the through-hole 411 of the housing 110. By disposing the first coil 513 in the through-hole 411 of the housing 110, the sizes of the actuator 10 and the camera module 1 may be prevented from increasing due to the thickness of the first coil 513.

The first magnet 511 may include one or a plurality of magnets, and the first coil 513 may include a number of coils corresponding to the number of magnets included in the first magnet 511.

For example, when the first magnet 511 may include only a single magnet, the first coil 513 may also include a coil, and when the first magnet 511 may include a plurality of magnets, the first coil 513 may also include a plurality of coils.

When the first magnet 511 includes a plurality of magnets, a portion of the plurality of magnets may be mounted on one side surface of the first carrier 200, and the other magnets may be mounted on the other side surface (a surface spaced apart from the one side surface in the first axis (X-axis) direction) of the first carrier 200.

The first magnet 511 may be a moving member mounted on the first carrier 200 and moving together with the first carrier 200, and the first coil 513 may be a fixed member fixed to the first substrate 550 and housing 110.

When power is applied to the first coil 513, the first carrier 200 may move in the first axis (X-axis) direction by electromagnetic force between the first magnet 511 and the first coil 513.

The second sub-driver 530 may include a second magnet 531 and a second coil 533. The second magnet 531 and the second coil 533 may face each other in a direction perpendicular to the optical axis (Z-axis).

The second magnet 531 may be disposed on the first carrier 200. For example, the second magnet 531 may be mounted on the side surface of the first carrier 200. A mounting groove 210 on which a second magnet 531 may be mounted may be provided in a side surface of the first carrier 200. By inserting the second magnet 531 into the mounting groove 210, the size of the actuator 10 and the camera module 1 may be prevented from increasing due to the thickness of the second magnet 531.

The second magnet 531 may be magnetized such that one surface (e.g., a surface facing the second coil 533) may have an N pole or an S pole. For example, when one surface of the second magnet 531 facing the second coil 533 has an N pole, the other surface of the second magnet 531 (e.g., the opposite surface of the one surface) may be magnetized to have an S pole.

The second coil 533 may be disposed to face the second magnet 531. For example, the second coil 533 may be disposed to face the second magnet 531 in a direction perpendicular to the optical axis (Z-axis). The second coil 533 may have a donut shape having a hollow shape, a shape having a length in the first axis (X-axis) direction.

The second coil 533 may be disposed on the first substrate 550. The first substrate 550 may be mounted on the housing 110 such that the second magnet 531 and the second coil 533 may face each other in a direction perpendicular to the optical axis (Z-axis).

A through-hole 411 may be provided in the housing 110. For example, the through-hole 411 may penetrate through the side surface of the housing 110 in a direction perpendicular to the optical axis (Z-axis). The second coil 533 may be disposed in the through-hole 411 of the housing 110. By disposing the second coil 533 in the through-hole 411 of the housing 110, the overall heights of the actuator 10 and the camera module 1 may be prevented from increasing due to the thickness of the second coil 533.

The second magnet 531 may include a plurality of magnets. The plurality of magnets of the second magnet 531 may be spaced apart from each other in the first axis (X-axis) direction. The second coil 533 may include a plurality of coils. A plurality of coils of the second coil 533 may be spaced apart from each other in the first axis (X-axis) direction.

The second magnet 531 may be a moving member mounted on the first carrier 200 and moving together with the first carrier 200, and the second coil 533 may be a fixed member fixed to the first substrate 550 and the housing 110.

When power is applied to the second coil 533, the first carrier 200 may move in the second axis (Y-axis) direction by the electromagnetic force between the second magnet 531 and the second coil 533.

Also, by generating a deviation in one or more of the magnitude of the driving force in the first axis (X-axis) direction and the magnitude of the driving force in the second axis (Y-axis) direction, the first carrier 200 may rotate.

As illustrated in FIG. 4, the first coil 513 and the second coil 533 may be provided as winding coils and may be mounted on the first substrate 550. As another example embodiment, the first coil 513 and the second coil 533 may be copper foil patterns laminated and embedded in the first substrate 550.

The first magnet 511 and the second magnet 531 may be disposed perpendicular to each other on a plane perpendicular to the optical axis (Z-axis), and the first coil 513 and the second coil 533 may also be disposed perpendicular to each other on a plane perpendicular to the optical axis (Z-axis).

A first ball member B1 may be disposed between the housing 110 and the first carrier 200.

The first ball member B1 may be disposed to be in contact with the housing 110 and the first carrier 200.

The first ball member B1 may guide the movement of the first carrier 200 in the process of optical image stabilization, and may also maintain a distance between the housing 110 and the first carrier 200 in the optical axis (Z-axis) direction.

When the first carrier 200 moves in a direction perpendicular to the optical axis (Z-axis) relative to the housing 110, the first ball member B1 may guide the movement of the first carrier 200 by rolling in a direction perpendicular to the optical axis (Z-axis).

For example, the first ball member B1 may roll in the first axis (X-axis) direction when driving force in the first axis (X-axis) direction occurs. Accordingly, the first ball member B1 may guide the movement of the first carrier 200 in the first axis (X-axis) direction.

Also, the first ball member B1 may roll in the second axis (Y-axis) direction when driving force in the second axis (Y-axis) direction occurs. Accordingly, the first ball member B1 may guide the movement of the first carrier 200 in the second axis (Y-axis) direction.

The first ball member B1 may include a plurality of balls disposed between the housing 110 and the first carrier 200. The number of balls included in the first ball member B1 may be three or more.

A guide groove on which the first ball member B1 is disposed may be disposed on at least one of the surfaces of the housing 110 and the first carrier 200 facing each other in the optical axis (Z-axis) direction. For example, the first guide groove 230 may be disposed on the upper surface of the first carrier 200, and the second guide groove 120 may be disposed on the inner upper surface of the housing 110.

The first ball member B1 may be disposed in the first guide groove 230 and the second guide groove 120 and may be inserted between the housing 110 and the first carrier 200.

In an example in which the first ball member B1 is accommodated in the first guide groove 230 and the second guide groove 120, movement of the first ball member B1 in the optical axis (Z-axis) direction may be limited, and the first ball member B1 may move in a direction perpendicular to the optical axis (Z-axis).

A planar shape of each of the first guide groove 230 and the second guide groove 120 may be polygonal or circular. The sizes of the first guide groove 230 and the second guide groove 120 may be larger than the diameter of the first ball member B1. For example, cross-sections of the first guide groove 230 and the second guide groove 120 on a plane perpendicular to the optical axis (Z-axis) may have a size larger than the diameter of the first ball member B1.

The first carrier 200 may be provided with a support pad 231, and at least a portion of the support pad 231 may form the bottom surface of the first guide groove 230. Accordingly, the first ball member B1 may roll while being in contact with the support pad 231.

The support pad 231 may be integrated with the first carrier 200 by insert injection. In this case, the support pad 231 may be manufactured to be integrated with the first carrier 200 by injecting a resin material into the mold while the support pad 231 is fixed to the mold. The support pad 231 may be formed of a stainless material.

The support pad 231 may also be provided on the housing 110.

The actuator 10 in an example embodiment may sense a position in a direction perpendicular to the optical axis (Z-axis) of the first carrier 200.

To this end, a first position sensor 515 and a second position sensor 535 may be provided. The first position sensor 515 may be disposed on the first substrate 550 to face the first magnet 511, and the second position sensor 535 may be disposed on the first substrate 550 to face the second magnet 531.

Each of the first position sensor 515 and the second position sensor 535 may include one or more Hall sensors.

For example, the first position sensor 515 may include two Hall sensors. In this case, the two Hall sensors may be spaced apart from each other in the first axis (X-axis) direction. When the first magnet 511 includes a plurality of magnets spaced apart from each other in the first axis (X-axis) direction, when the first magnet 511 moves in the first axis (X-axis) direction, a sum of the distances in the first axis (X-axis) direction between the two Hall sensors and the plurality of magnets may be constant. Accordingly, precise position sensing may be performed.

The second position sensor 535 may include two Hall sensors. The two Hall sensors of the second position sensor 535 may be spaced apart from each other in the first axis (X-axis) direction. A direction in which the two Hall sensors of the second position sensor 535 are spaced apart from each other and a direction in which the second magnet 531 and the second coil 533 face each other may be perpendicular to each other.

For example, the second magnet 531 may include two magnets spaced apart from each other in a direction (first axis (X-axis) direction) perpendicular to the direction (second axis (Y-axis) direction) in which driving force is generated by the second magnet 531, and the second position sensor 535 may include two Hall sensors disposed to face the two magnets.

Whether the first carrier 200 rotates may be sensed through two Hall sensors facing the second magnet 531.

Rotational force may be intentionally generated by generating a deviation between the driving force of the first sub-driver 510 and the driving force of the second sub-driver 530, using the resultant force of the first sub-driver 510 and the second sub-driver 530, or using two magnets included in the second sub-driver 530.

Since the first guide groove 230 and the second guide groove 120 have a polygonal or circular shape larger than the diameter of the first ball member B1, the first ball member B1 may roll in several directions perpendicular to the optical axis (Z-axis).

Accordingly, the first carrier 200 may rotate with reference to the optical axis (Z-axis) while being supported by the first ball member B1.

For ease of description, it has been described that the first carrier 200 rotates with respect to the optical axis (Z-axis) as a rotation axis, but when the first carrier 200 rotates, the rotation axis may not coincide with the optical axis (Z-axis). For example, the first carrier 200 may rotate using an arbitrary axis parallel to the direction in which the imaging plane of the image sensor S is oriented as a rotation axis.

Also, when rotation is not required and linear movement is required, the driving force of the first sub-driver 510 and/or the driving force of the second sub-driver 530 may be controlled to offset the rotational force generated unintentionally.

A first yoke 570 may be disposed in the housing 110. The first yoke 570 provides attractive force such that the housing 110 and the first carrier 200 may maintain to be in contact with the first ball member B1.

The first yoke 570 may be buried in the housing 110. For example, the first yoke 570 may be integrated with the housing 110 by insert molding. In this case, the first yoke 570 may be manufactured to be integrated with the housing 110 by injecting a resin material into the mold while the first yoke 570 is fixed to the mold.

The first yoke 570 may be disposed to face the first magnet 511 and the second magnet 531 in the optical axis (Z-axis) direction.

Attractive force may act between the first yoke 570 and the first magnet 511 and between the first yoke 570 and the second magnet 531 in the optical axis (Z-axis) direction.

Accordingly, since the first carrier 200 is pressed in a direction toward the housing 110, the housing 110 and the first carrier 200 may maintain to be in contact with the first ball member B1.

By the attractive force, the first carrier 200 may form a three-point support for the first ball member B1.

The first yoke 570 may be a material for generating attractive force between the first magnet 511 and the second magnet 531. For example, the first yoke 570 may be formed of a magnetic material.

The number of the first yokes 570 is not limited to any particular example, but the first yoke 570 may be disposed in a support region in which the attraction between the first yoke 570 and the first magnet 511 and the center of attraction between the first yoke 570 and the second magnet 531 connect the plurality of balls included in the first ball member B1 to each other.

Referring to FIGS. 4 to 6, the actuator 10 may include a damping portion. The damping portion may include a plurality of damping grooves 130, a plurality of damping pins 250 and a damping gel.

A plurality of damping grooves 130 may be disposed in the housing 110. For example, a plurality of damping grooves 130 may be formed on the inner upper surface of the housing 110. Also, the plurality of damping grooves 130 may be disposed adjacent to the second guide groove 120.

The first carrier 200 may include a plurality of damping pins 250 extending toward the plurality of damping grooves 130. For example, the plurality of damping pins 250 protruding in the optical axis (Z-axis) direction may be disposed on the corners of the upper surface of the first carrier 200.

At least a portion of the damping pin 250 extending from the first carrier 200 may be accommodated in each damping groove 130. For example, the plurality of damping pins 250 protruding from the first carrier 200 may be disposed on the first carrier 200 so as to extend in the optical axis (Z-axis) direction, and at least a portion of each damping pin 250 may be disposed in each damping groove 130 of the housing 110.

A damping gel may be disposed in the plurality of damping grooves 130. A portion of the damping pin 250 may be disposed in the damping gel.

During optical image stabilization, since the first carrier 200 is a moving member and the housing 110 is a fixed member, the damping pin 250 may move relative to the damping groove 130. Also, since the damping pin 250 is immersed in the damping gel, resistance may be generated by the damping gel when the damping pin 250 moves. Accordingly, the damping structure may be easily implemented.

Figure 9:
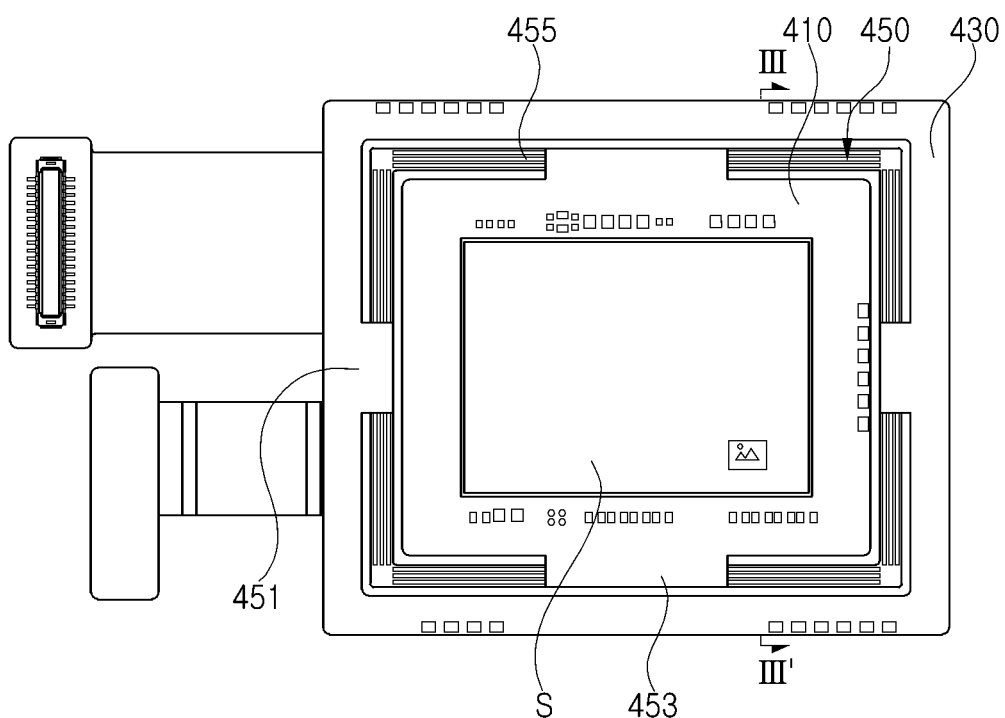
FIG. 9 is a plan diagram illustrating a sensor substrate of an actuator according to an example embodiment of the present disclosure.
Figure 10:
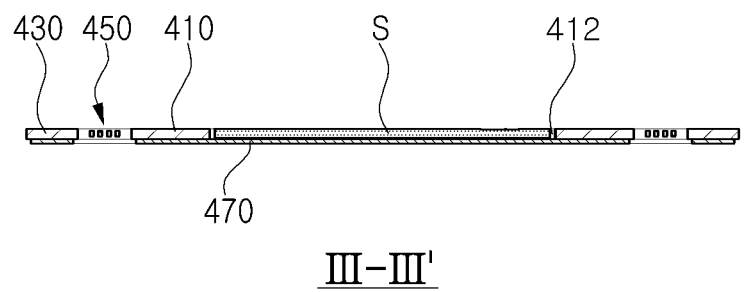
FIG. 10 is a cross-sectional diagram taken along line III-III' in FIG. 9.

FIG. 9 is a plan diagram illustrating a sensor substrate of an actuator according to an example embodiment. FIG. 10 is a cross-sectional diagram taken along line III-III' in FIG. 9.

Referring to FIGS. 9 and 10, the sensor substrate 400 may include a moving portion 410, a fixed portion 430 and a connection portion 450. The sensor substrate 400 may be a rigid flexible printed circuit board (PCB) (RF PCB).

An image sensor S may be mounted on the moving portion 410. The moving portion 410 may be coupled to the lower surface of the second carrier 300 to be described later. For example, the area of the moving portion 410 may be larger than that of the image sensor S, and the moving portion 410 of the outer portion of the image sensor S may be coupled to the lower surface of the second carrier 300.

The moving portion 410 may be a moving member moving together with the first carrier 200 and the second carrier 300 during optical image stabilization. The moving portion 410 may be a rigid PCB.

The fixed portion 430 may be coupled to the lower surface of the housing 110. The fixed portion 430 may be a fixed member configured to not move during optical image stabilization. The fixed portion 430 may be a rigid PCB.

The connection portion 450 may be disposed between the moving portion 410 and the fixed portion 430, and may connect the moving portion 410 to the fixed portion 430. The connection portion 450 may be a flexible PCB. When the moving portion 410 moves, the connection portion 450 disposed between the moving portion 410 and the fixed portion 430 may be bent.

The connection portion 450 may extend along the circumference of the moving portion 410. The connection portion 450 may include a plurality of slits penetrating the connection portion 450 in the optical axis (Z-axis) direction. The plurality of slits may be disposed with a distance therebetween between the moving portion 410 and the fixed portion 430. Accordingly, the connection portion 450 may include a plurality of bridge elements 455 spaced apart from each other by the plurality of slits. A plurality of bridge elements 455 may extend along the circumference of the moving portion 410.

The connection portion 450 may include a first support portion 451 and a second support portion 453. The connection portion 450 may be connected to the fixed portion 430 through the first support portion 451. Also, the connection portion 450 may be connected to the moving portion 410 through the second support portion 453.

For example, the first support portion 451 may be connected to and in contact with the fixed portion 430 and may be spaced apart from the moving portion 410. Also, the second support portion 453 may be connected to and in contact with the moving portion 410 and may be spaced apart from the fixed portion 430.

For example, the first support portion 451 may extend in a first axis (X-axis) direction and may connect a plurality of bridge elements 455 of the connection portion 450 to the fixed portion 430. In an example embodiment, the first support portion 451 may include two support portions disposed opposite to each other in a first axis (X-axis) direction.

The second support portion 453 may extend in a second axis (Y-axis) direction and may connect the plurality of bridge elements 455 of the connection portion 450 to the moving portion 410. In an example embodiment, the second support portion 453 may include two support portions disposed opposite to each other in the second axis (Y-axis) direction.

Accordingly, the moving portion 410 may move in a direction perpendicular to the optical axis (Z-axis) or may rotate with respect to the optical axis (Z-axis) while being supported by the connection portion 450.

In an example embodiment, when the image sensor S moves in the first axis (X-axis) direction, the plurality of bridge elements 455 connected to the first support portion 451 may be bent. Also, when the image sensor S moves in the second axis (Y-axis) direction, the plurality of bridge elements 455 connected to the second support portion 453 may be bent. Also, when the image sensor S rotates, the plurality of bridge elements 455 connected to the first support portion 451 and the plurality of bridge elements 455 connected to the second support portion 453 may be bent together.

In an example embodiment, the length of the fixed portion 430 in the first axis (X-axis) direction and the length in the second axis (Y-axis) direction may be different. For example, the length of the fixed portion 430 in the second axis (Y-axis) direction may be longer than the length in the first axis (X-axis) direction. In an example embodiment, the sensor substrate 400 may have a substantially rectangular shape.

In the sensor substrate 400 configured as above, when the length of the first support portion 451 and the length of the second support portion 453 are equal to each other, the load applied to the plurality of bridge elements 455 connected to the first support portion 451 and the load applied to the plurality of bridge elements 455 connected to the second support portion 453 may be different, and accordingly, there may be difficulty in driving control.

Accordingly, by configuring the length of the first support portion 451 and the length of the second support portion 453 to be different, the length of the plurality of bridge elements 455 extending in the second axis (Y-axis) direction from the first support portion 451 and the length of the plurality of bridge elements extending in the first axis (X-axis) direction from the second support portion 453 455 may become almost the same.

Here, the length of the first support portion 451 may refer to the length in the second axis (Y-axis) direction, and the length of the second support portion 453 may refer to the length in the first axis (X-axis) direction.

Referring to FIG. 10, a through-hole 412 may be formed in the moving portion 410, and an image sensor S may be disposed in the through-hole 412. The thickness of the through-hole 412 and the thickness of the image sensor S may be substantially the same.

A reinforcement plate 470 may be coupled to the lower surface of the moving portion 410. The reinforcement plate 470 may also be coupled to the lower surface of the fixed portion 430.

Accordingly, the height in the optical axis (Z-axis) direction may be reduced by the thickness of the image sensor S as compared to the example in which the image sensor S is disposed on the upper surface of the sensor substrate 400.

Referring to FIG. 2, a base 700 may be coupled to a lower portion of the sensor substrate 400.

The base 700 may be coupled to the sensor substrate 400 to cover a lower portion of the sensor substrate 400. The base 700 may prevent external foreign substances from entering through a gap between the moving portion 410 and the fixed portion 430 of the sensor substrate 400.

A heat dissipation film may be disposed below the base 700. Accordingly, heat generated from the image sensor S may be effectively dissipated.

Figure 11:
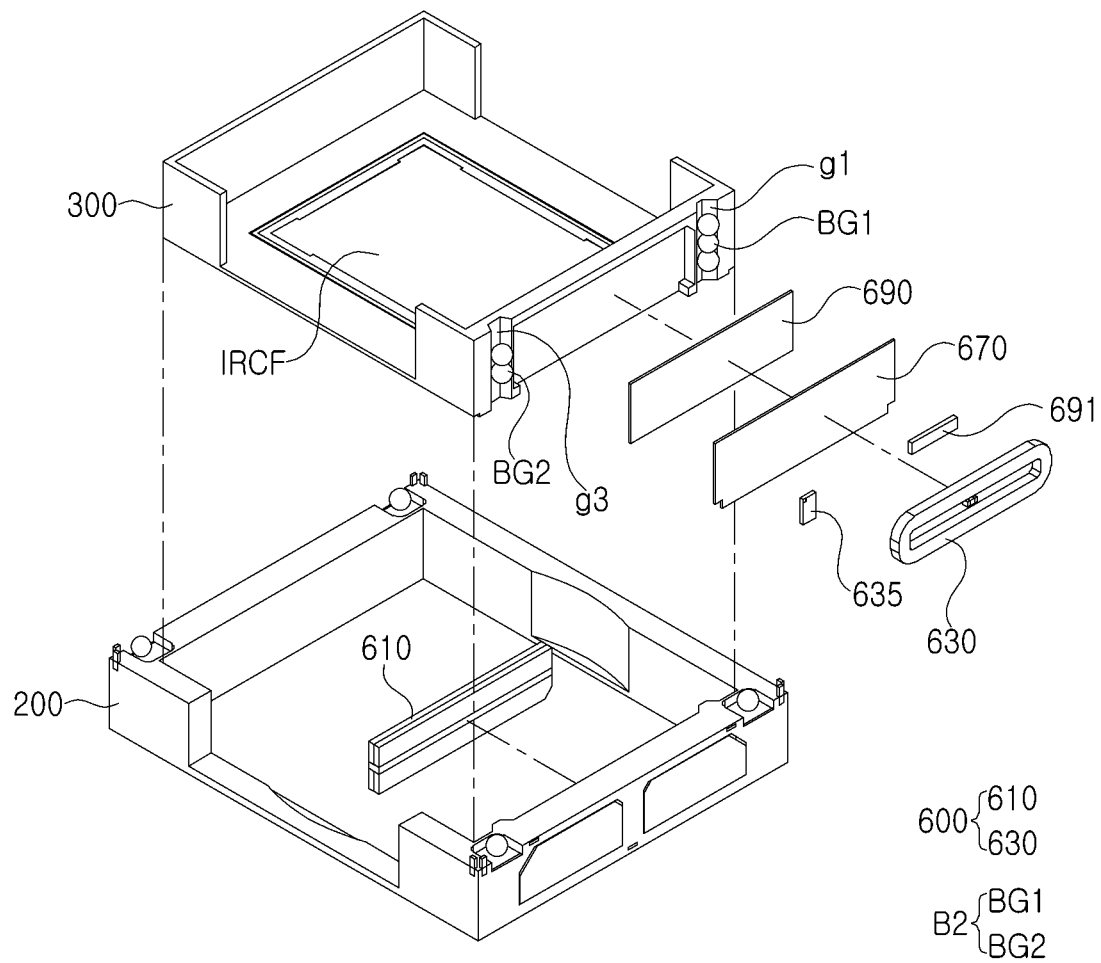
FIG. 11 is an exploded perspective diagram illustrating a first carrier, a second carrier, and a second driver according to an example embodiment of the present disclosure.
Figure 12:
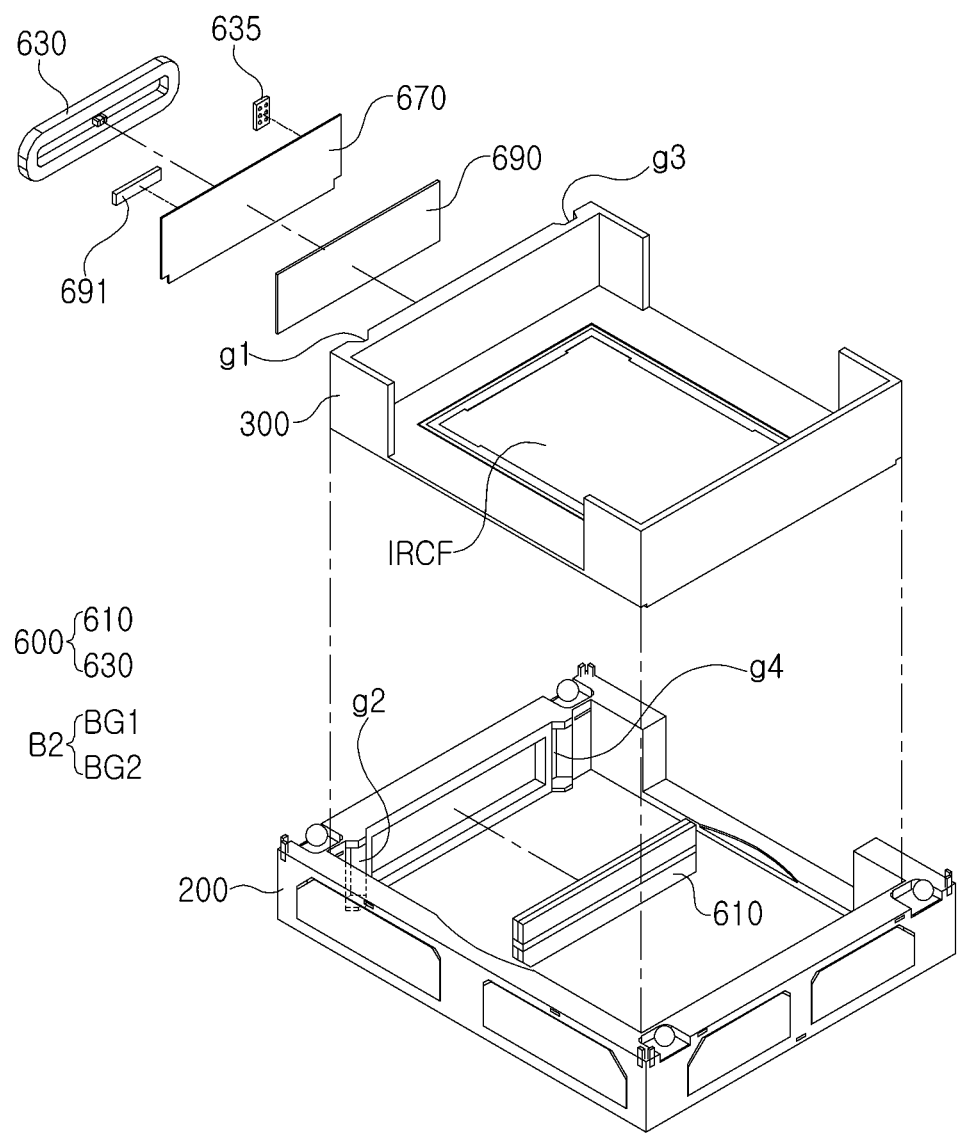
FIG. 12 is a perspective diagram illustrating the example in FIG. 11, viewed in a different direction.
Figure 13:
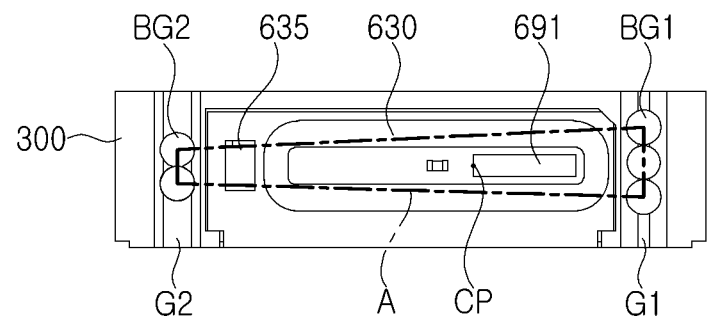
FIG. 13 is a diagram illustrating a second carrier.

FIG. 11 is an exploded perspective diagram illustrating a first carrier, a second carrier, and a second driver according to an example embodiment. FIG. 12 is a perspective diagram illustrating the example in FIG. 11, viewed in a different direction. FIG. 13 is a diagram illustrating a second carrier.

Referring to FIGS. 11 to 13, the second carrier 300 may be disposed in the first carrier 200.

The second carrier 300 may be disposed in the first carrier 200 and may move along with the first carrier 200 in a direction perpendicular to the optical axis (Z-axis), and may move relative to the first carrier 200 in the optical axis (Z-axis) direction.

The second driver 600 may move the second carrier 300 in the optical axis (Z-axis) direction by generating driving force in the optical axis (Z-axis) direction.

The second driver 600 may include a third magnet 610 and a third coil 630. The third magnet 610 and the third coil 630 may be disposed to face each other in a direction perpendicular to the optical axis (Z-axis).

A third magnet 610 may be disposed on one of the first carrier 200 and the second carrier 300, and a first coil 630 may be disposed on the other. Hereinafter, an example embodiment in which the third magnet 610 may be disposed on the first carrier 200 will be described, but the positions of the third magnet 610 and the first coil 630 may be interchanged.

The third magnet 610 may be disposed on the first carrier 200. For example, the third magnet 610 may be disposed on the inner side surface of the first carrier 200. The third magnet 610 may be disposed to overlap the first magnet 511 in the first axis (X-axis) direction.

The third magnet 610 may be magnetized such that one surface (e.g., a surface facing the third coil 630) may have both an N pole and an S pole. For example, one surface of the third magnet 610 facing the third coil 630 may be provided with an N pole, a neutral region, and an S pole in order in the optical axis (Z-axis) direction.

The other surface (e.g., the surface opposite to the one surface) of the third magnet 610 may be magnetized to have both the S pole and the N pole. For example, the other surface of the third magnet 610 may be provided with an S pole, a neutral region, and an N pole in order in the optical axis (Z-axis) direction.

The third coil 630 may be disposed on the second carrier 300. For example, the third coil 630 may be disposed on one side surface of the second carrier 300. The third coil 630 may be disposed to face the third magnet 610 in a direction perpendicular to the optical axis (Z-axis).

The third coil 630 may be disposed on the second substrate 670, and the second substrate 670 may be mounted on the second carrier 300 such that the third magnet 610 and the third coil 630 may face each other in a direction perpendicular to the optical axis (Z-axis).

During focus adjustment, the third magnet 610 may be a fixed member fixed to the first carrier 200, and the third coil 630 may be a moving member mounted on the second substrate 670 and the second carrier 300 and may move in the optical axis (Z-axis) direction together with the second carrier 300.

When power is applied to the third coil 630, the second carrier 300 may move in the optical axis (Z-axis) direction by the electromagnetic force between the third magnet 610 and the third coil 630.

Since the second carrier 300 may be coupled to the sensor substrate 400 on which the image sensor S is mounted, the image sensor S may also move in the optical axis (Z-axis) direction by the movement of the second carrier 300.

A second ball member B2 may be disposed between the first carrier 200 and the second carrier 300. The second ball member B2 may include a plurality of balls disposed in the optical axis (Z-axis) direction. A plurality of balls may roll in the optical axis (Z-axis) direction when the second carrier 300 moves in the optical axis (Z-axis) direction.

A second yoke 690 may be disposed in the second carrier 300. The second yoke 690 may be disposed in a position facing the third magnet 610. For example, a third coil 630 may be disposed on one surface of the second substrate 670, and a second yoke 690 may be disposed on the other surface of the second substrate 670.

The third magnet 610 and the second yoke 690 may generate attractive force therebetween. For example, attractive force may act between the third magnet 610 and the second yoke 690 in a direction perpendicular to the optical axis (Z-axis).

By the attraction of the third magnet 610 and the second yoke 690, the second ball member B2 may be in contact with the first carrier 200 and the second carrier 300, respectively.

Guide grooves may be disposed on surfaces on which the first carrier 200 and the second carrier 300 face each other. For example, a first groove g1 and a third groove g3 may be disposed in the second carrier 300, and a second groove g2 and a fourth groove g4 may be disposed in the first carrier 200. Each groove may have a shape having a length in the optical axis (Z-axis) direction.

The first groove g1 and the second groove g2 may be disposed to face each other in a direction perpendicular to the optical axis (Z-axis), and a portion (e.g., a first ball group BG1 described later) of the plurality of balls of the second ball member B2 may be disposed in the space between the first groove g1 and the second groove g2.

Among the plurality of balls included in the first ball group BG1, the balls disposed on the outermost side in a direction parallel to the optical axis (Z-axis) may be in two-point contact with the first groove g1 and the second groove g2, respectively.

That is, among the plurality of balls included in the first ball group BG1, the balls disposed on the outermost side in a direction parallel to the optical axis (Z-axis) may be in two-point contact with the first groove g1, and may be in two-point contact with the second groove g2.

The first groove g1 and the second groove g2 may be included in the main rolling portion G1, and the first ball group BG1 and the main rolling portion G1 may function as a main guide for guiding movement of the second carrier 300 in the optical axis (Z-axis) direction.

The third groove g3 and the fourth groove g4 may be disposed to face each other in a direction perpendicular to the optical axis (Z-axis) direction, and a portion (e.g., a second ball group BG2 to be described later) of the plurality of balls of the second ball member B2 may be disposed in the space between the third groove g3 and the fourth groove g4.

Among the plurality of balls included in the second ball group BG2, balls disposed on the outermost side in a direction parallel to the optical axis (Z-axis) may be in two-point contact with one of the third groove g3 and fourth groove g4 and may be in one-point contact with the other of the third groove g3 and fourth groove g4.

For example, among the plurality of balls included in the second ball group BG2, balls disposed on the outermost side in a direction parallel to the optical axis (Z-axis) may be in one-point contact with the third groove g3, and may be in two-point contact with the fourth groove g4 (or vice versa).

The third groove g3 and the fourth groove g4 may be included in an auxiliary rolling portion G2, and the second ball group BG2 and the auxiliary rolling portion G2 may function as an auxiliary guide for supporting movement of the second carrier 300 in the optical axis (Z-axis) direction.

The second ball member B2 may include a first ball group BG1 and a second ball group BG2, and each of the first ball group BG1 and the second ball group BG2 may include a plurality of balls disposed in the optical axis (Z-axis) direction.

The first ball group BG1 and the second ball group BG2 may be spaced apart from each other in a direction (e.g., Y-axis direction) perpendicular to the optical axis (Z-axis) (e.g., Y-axis direction). The number of balls in the first ball group BG1 and the number of balls in the second ball group BG2 may be different.

For example, the first ball group BG1 may include two or more balls disposed in the optical axis (Z-axis) direction, and the second ball group BG2 may include fewer balls than the number of balls included in the first ball group BG1.

The number of balls belonging to each ball member may be varied on the premise that the number of balls belonging to the first ball group BG1 and the number of balls belonging to the second ball group BG2 are different. Hereinafter, for ease of description, the example embodiment in which the first ball group BG1 includes three balls and the second ball group BG2 includes two balls is described.

Among the three balls included in the first ball group BG1, two balls disposed on the outermost side in a direction parallel to the optical axis (Z-axis) may have the same diameter, and a ball disposed therebetween may have a smaller diameter than those of the balls disposed on the outermost side.

For example, among the plurality of balls included in the first ball group BG1, each of two balls disposed on the outermost side in a direction parallel to the optical axis (Z-axis) may have a first diameter, a ball disposed therebetween may have a second diameter, and the first diameter may be greater than the second diameter.

The two balls included in the second ball group BG2 may have the same diameter. For example, the two balls included in the second ball group BG2 may have a third diameter.

Also, the first diameter and the third diameter may be the same. Here, the configuration in which the diameters are the same may indicate that the diameters are physically the same, and may also include errors in manufacturing.

the distance between the centers of the balls among the plurality of balls included in the first ball group BG1, disposed on the outermost side in a direction parallel to the optical axis (Z-axis), and the distance between the centers of the balls among the plurality of balls included in the second ball group BG2, disposed on the outermost side in a direction parallel to the optical axis (Z-axis), may be different.

For example, the distance between the centers of two balls having a first diameter may be greater than the distance between the centers of two balls having a third diameter.

When the second carrier 300 moves in the optical axis (Z-axis) direction, to move in parallel to the optical axis (Z-axis) (to prevent tilting), the center of attraction CP acting between the third magnet 610 and the second yoke 690 may need to be disposed in the support region A connecting the contact points of the second ball member B2 and the second carrier 300 (or the first carrier 200).

When the center of attraction CP moves out of the support region A, the position of the second carrier 300 may be distorted during the movement of the second carrier 300, which may cause tilting. Accordingly, it may be necessary to form the support region A to have a relatively wide area.

In an example embodiment, a size (e.g., diameter) of a portion of the plurality of balls of the second ball member B2 may be intentionally configured to be smaller than the size (e.g., diameter) of the other balls. In this case, balls having a relatively large size among the plurality of balls may be intentionally configured to be in contact with the second carrier 300 (or the first carrier 200).

Since the diameter of two balls among the three balls of the first ball group BG1 is larger than the diameter of the other ball, the two balls of the first ball group BG1 may be in contact with the first carrier 200 and the second carrier 300, respectively. Also, since the two balls of the second ball group BG2 may have the same diameter, the two balls of the second ball group BG2 may be in contact with the first carrier 200 and the second carrier 300, respectively.

Accordingly, as illustrated in FIG. 13, when viewed in the first axis (X-axis) direction, the second ball member B2 may be in four-point contact with the first carrier 200 (or the second carrier 300). Also, the support region A connecting the contact points to each other may have a rectangular shape (e.g., trapezoidal shape).

Accordingly, the support region A may be formed to have a relatively wide area, and thus, the center of attraction CP acting between the third magnet 610 and the second yoke 690 may be stably disposed in the support region A. Accordingly, driving stability may be ensured during focus adjustment.

Even when the two balls of the second ball group BG2 are manufactured to have the same diameter, the two balls of the second ball group BG2 may not physically have the same diameter due to errors in manufacturing. In this case, one of the two balls of the second ball group BG2 may be in contact with the second carrier 300 (or first carrier 200).

Accordingly, a support region A in which contact points at which the second ball member B2 is in contact with the second carrier 300 (or first carrier 200) are connected to each other may have a triangular shape.

Even when the support region A has a triangular shape, the support region A may be formed to have a relatively wide area by the balls among the three balls of the first ball group (BG1), disposed on the outermost side in a direction parallel to the optical axis (Z-axis), such that driving stability during focus adjustment may be ensured.

In addition to ensuring driving stability during focus adjustment, it may be important to reduce (to slim) the height of the camera module 1 in the optical axis (Z-axis) direction. When the height of the camera module 1 in the optical axis (Z-axis) direction is reduced, the height of the support region A in the optical axis (Z-axis) direction may also be reduced.

That is, when simply reducing the height of the camera module 1 in the optical axis (Z-axis) direction, there may be an issue in driving stability during focus adjustment.

In an example embodiment, an auxiliary yoke 691 may be disposed in a position facing the third magnet 610. For example, the auxiliary yoke 691 may be disposed on the inner side of the third coil 630 to face the third magnet 610.

The auxiliary yoke 691 may be disposed closer to the main guide than to the auxiliary guide. The auxiliary yoke 691 may be a material for generating attractive force for the third magnet 610.

Accordingly, the resultant force of the attractive force acting between the third magnet 610 and the second yoke 690 and the attractive force generated between the third magnet 610 and the auxiliary yoke 691 may be positioned closer to the main guide than to the auxiliary guide.

In another example embodiment, the third magnet 610 may be disposed eccentrically to one of sides of the third magnet 610 in the length direction (e.g., second axis (Y-axis) direction) on one inner side surface of the first carrier 200.

The center of one inner side surface of the first carrier 200 and the center of the third magnet 610 may be misaligned. The direction in which the third magnet 610 is eccentric may be directed to the main guide.

That is, the third magnet 610 may be disposed closer to the main guide than to the auxiliary guide.

Since the length of the support region A in the optical axis (Z-axis) direction is longer as it is closer to the main guide, by disposing the third magnet 610 closer to the main guide, the center of attraction CP may be stably positioned within the support region A.

The actuator 10 may sense the position of the second carrier 300 in the optical axis (Z-axis) direction.

To this end, a third position sensor 635 may be provided. The third position sensor 635 may be disposed on the second substrate 670 to face the third magnet 610. The third position sensor 635 may be a Hall sensor.

The camera module 1 in an example embodiment may be configured such that the image sensor S may move in the optical axis (Z-axis) direction during autofocusing, and the image sensor S may move in a direction perpendicular to the optical axis (Z-axis) during image stabilization.

Also, even when the image sensor S moves in the optical axis (Z-axis) direction during focus adjustment, the relative positions of the magnets and coils of the first driver 500 may not change, such that the driving force for optical image stabilization may be precisely controlled.

Also, even when the image sensor S moves in a direction perpendicular to the optical axis (Z-axis) during optical image stabilization, the relative positions of the magnet and the coil of the second driver 600 may not change, such that the driving force for focus adjustment may be precisely controlled.

Figure 14:
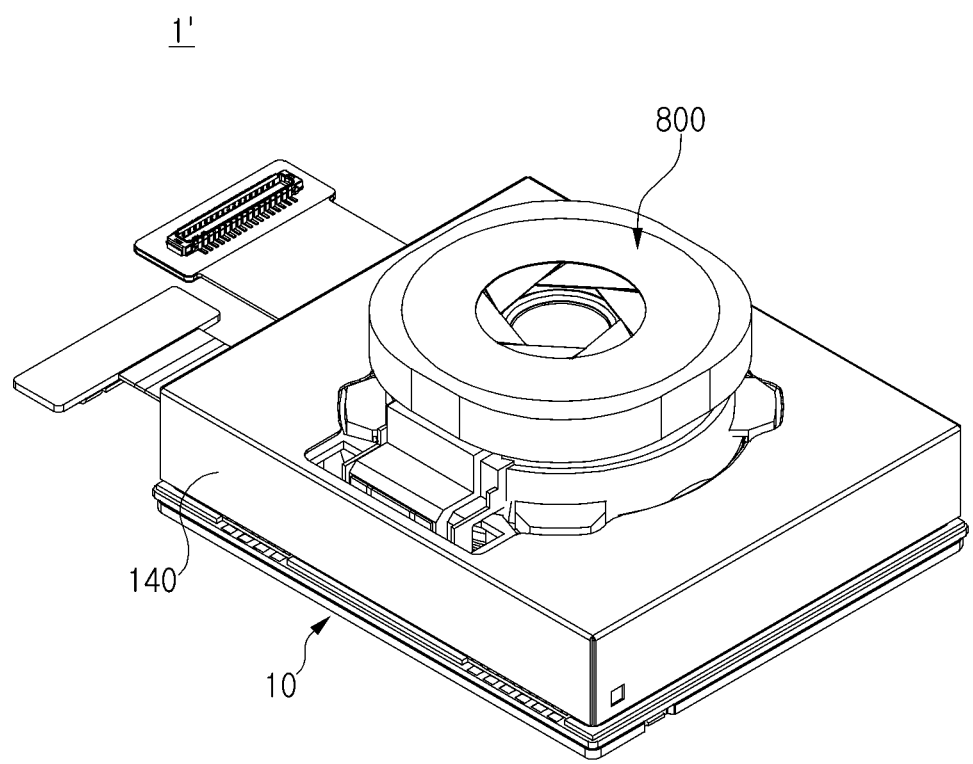
FIG. 14 is a perspective diagram illustrating a camera module according to another example embodiment of the present disclosure.
Figure 15:
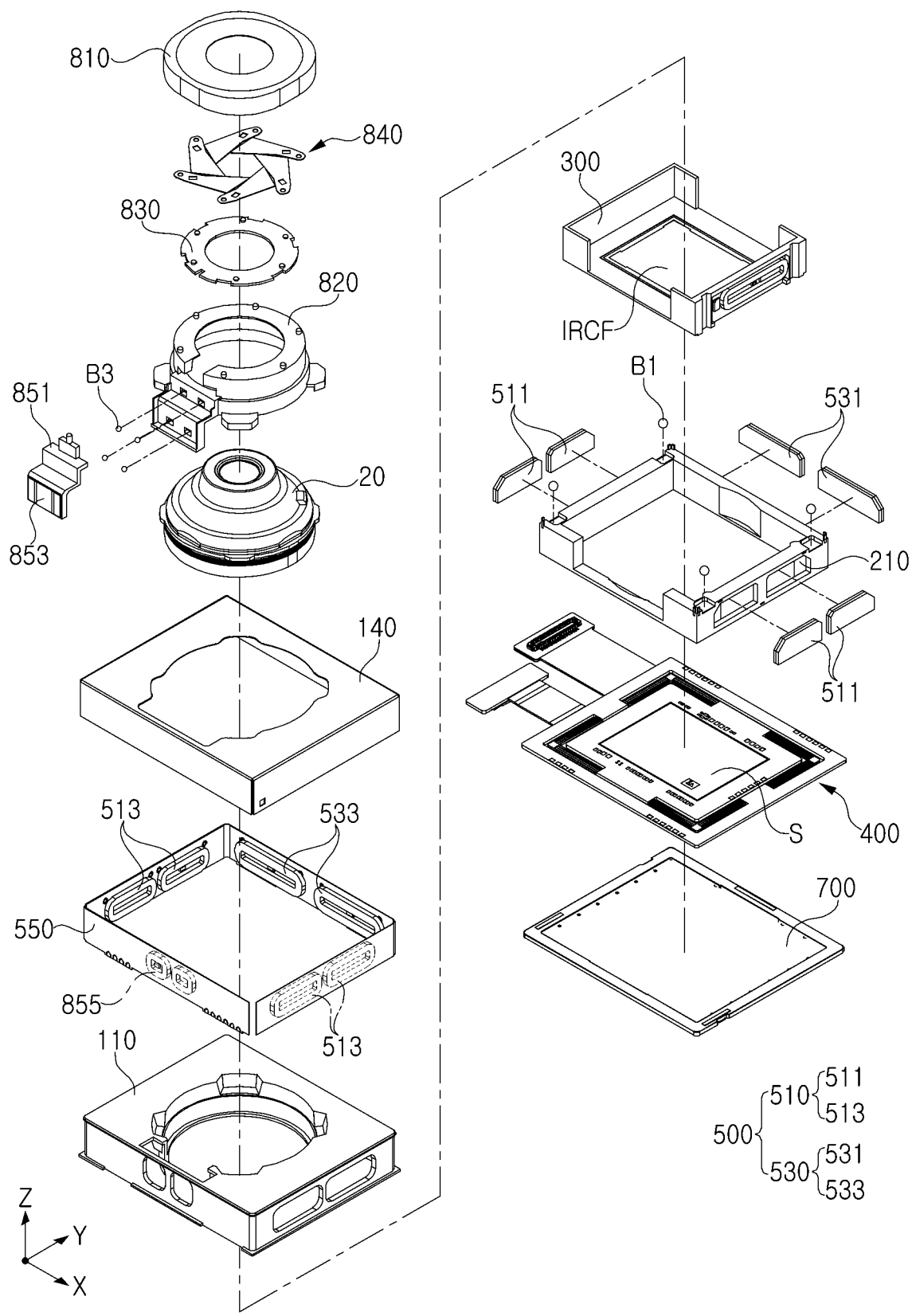
FIG. 15 is an exploded perspective diagram illustrating a camera module according to another example embodiment of the present disclosure.
Figure 16:
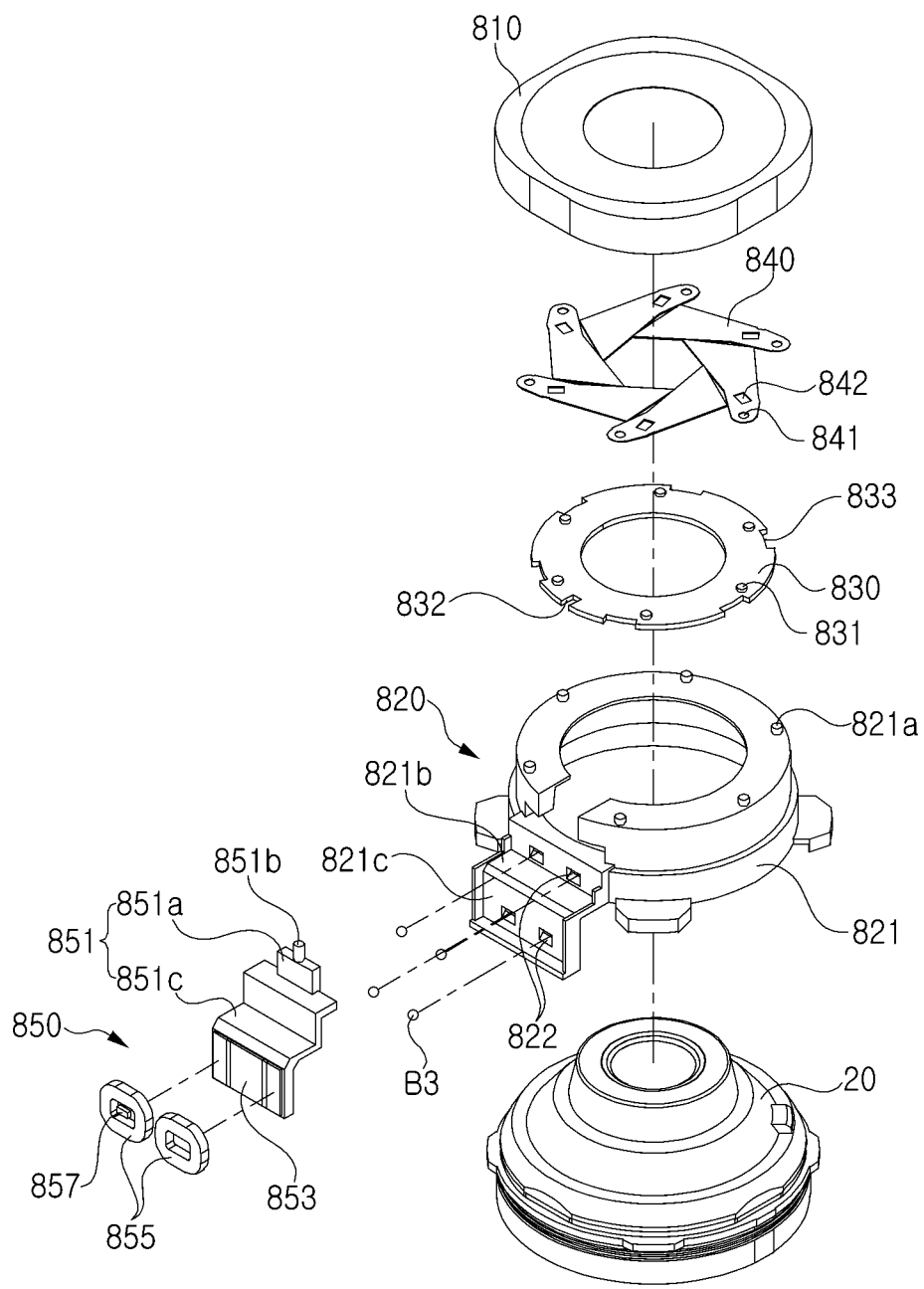
FIG. 16 is an exploded perspective diagram illustrating a stop module according to another example embodiment of the present disclosure.

FIG. 14 is a perspective diagram illustrating a camera module according to another example embodiment. FIG. 15 is an exploded perspective diagram illustrating a camera module according to another example embodiment. FIG. 16 is an exploded perspective diagram illustrating a stop module according to another example embodiment.

Referring to FIGS. 14 to 16, a camera module 1' according to another example embodiment may include a stop module 800, a lens module 20 and an actuator 10.

Since the configuration of the lens module 20 and actuator 10 is the same as that of the camera module 1 in the example embodiment described above, a further detailed description thereof will not be provided.

The stop module 800 may include a stop base 820, a rotational plate 830, a plurality of blades 840 and a stop driver 850, and may further include a cover 810.

The stop base 820 may have open upper and lower portions and may be coupled to the housing 110 of the actuator 10.

The stop base 820 may include a base body 821, a first extension portion 821b, and a second extension portion 821c. The first extension portion 821b may extend in a direction perpendicular to the optical axis (Z-axis) from one side of the base body 821, and the second extension portion 821c may extend in the optical axis (Z-axis) direction from the first extension portion 821b. For example, one side of the stop base 820 may have a stair shape. A support protrusion 821a may be disposed on the base body 821.

The rotational plate 830 may be disposed on the upper surface of the stop base 820 to rotate. A stopper groove 833 may be disposed on the outer side surface of the rotational plate 830, and a support protrusion 821a of the stop base 820 may be disposed in the stopper groove 833. The rotation range of the rotational plate 830 may be limited by the support protrusion 821a and the stopper groove 833.

A plurality of blades 840 may be disposed on the upper surface of the rotational plate 830 to rotate. A support hole 841 may be disposed in the plurality of blades 840. As the support protrusion 821a of the stop base 820 is inserted into the support hole 841 of the plurality of blades 840, the plurality of blades 840 may rotate using the support protrusion 821*a* as a rotation axis.

Also, a guide protrusion 831 may be disposed on the rotational plate 830, and a guide hole 842 into which the guide protrusion 831 is inserted may be disposed in the plurality of blades 840. As the rotational plate 830 rotates, the guide protrusion 831 may move in the guide hole 842, and accordingly, the plurality of blades 840 may rotate with the support protrusion 821*a* as a rotation axis.

As the plurality of blades 840 rotate, the size of the incident hole surrounded by the plurality of blades 840 may change. Accordingly, the amount of light incident to the lens module may be adjusted.

The stop module 800 may include a stop driver 850 for rotating the rotational plate 830. The stop driver 850 may include a magnet holder 851, a fourth magnet 853 and a fourth coil 855.

The fourth magnet 853 may be mounted on the magnet holder 851, and the magnet holder 851 may be disposed on the stop base 820 to move.

A third ball member B3 may be disposed between the stop base 820 and the magnet holder 851. A guide groove 822 on which a third ball member B3 is disposed may be formed on at least one of the surfaces of the stop base 820 and the magnet holder 851 facing each other in a direction perpendicular to the optical axis (Z-axis).

The guide groove 822 may have a rectangular shape with a length in a direction perpendicular to the optical axis (Z-axis), and the third ball member B3 may roll in the length direction of the guide groove 822.

The magnet holder 851 may include a holder body 851*a*, a guide pin 851*b* and a magnet mounting portion 851*c*. The guide pin 851*b* may extend from the holder body 851*a* in the optical axis (Z-axis) direction, and the rotational plate 830 may have a coupling hole 832 engaged with the guide pin 851*b*. Accordingly, the linear movement of the magnet holder 851 may be converted into a rotational movement of the rotational plate 830.

The magnet mounting portion 851*c* may have a shape corresponding to a stepped shape of one side of the stop base 820.

The fourth coil 855 may be disposed to face the fourth magnet 853. For example, the fourth coil 855 may be disposed on the first substrate 550. A position sensor 857 may be disposed on an inner side of the fourth coil 855 to face the fourth magnet 853.

The cover 810 may be disposed to cover at least a portion of the stop base 820.

Figure 17:
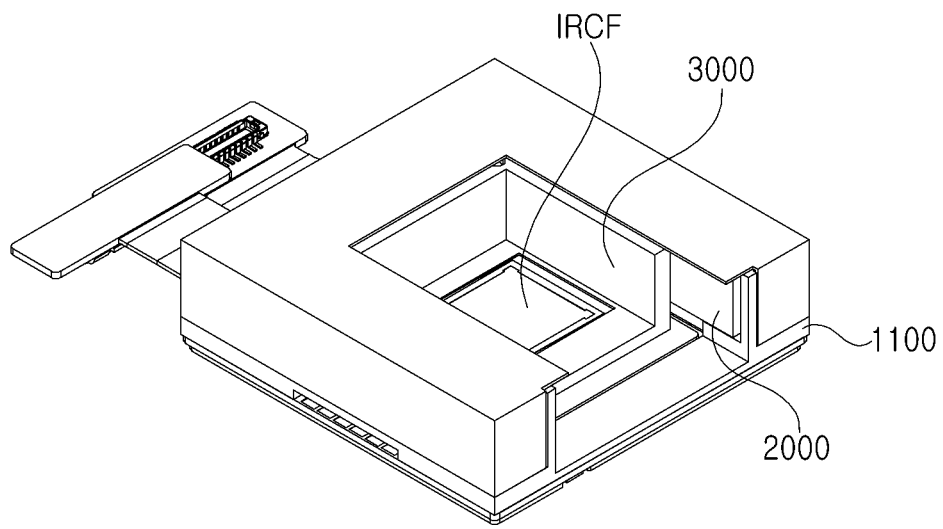
FIG. 17 is a perspective diagram illustrating an actuator for a camera according to another example embodiment of the present disclosure.
Figure 18:
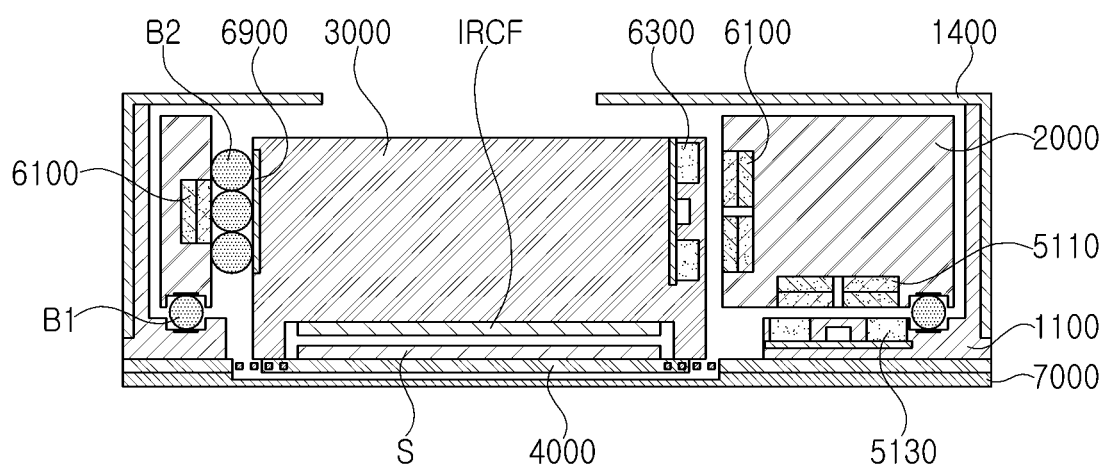
FIG. 18 is a diagram illustrating an actuator for a camera according to another example embodiment of the present disclosure.
Figure 19:
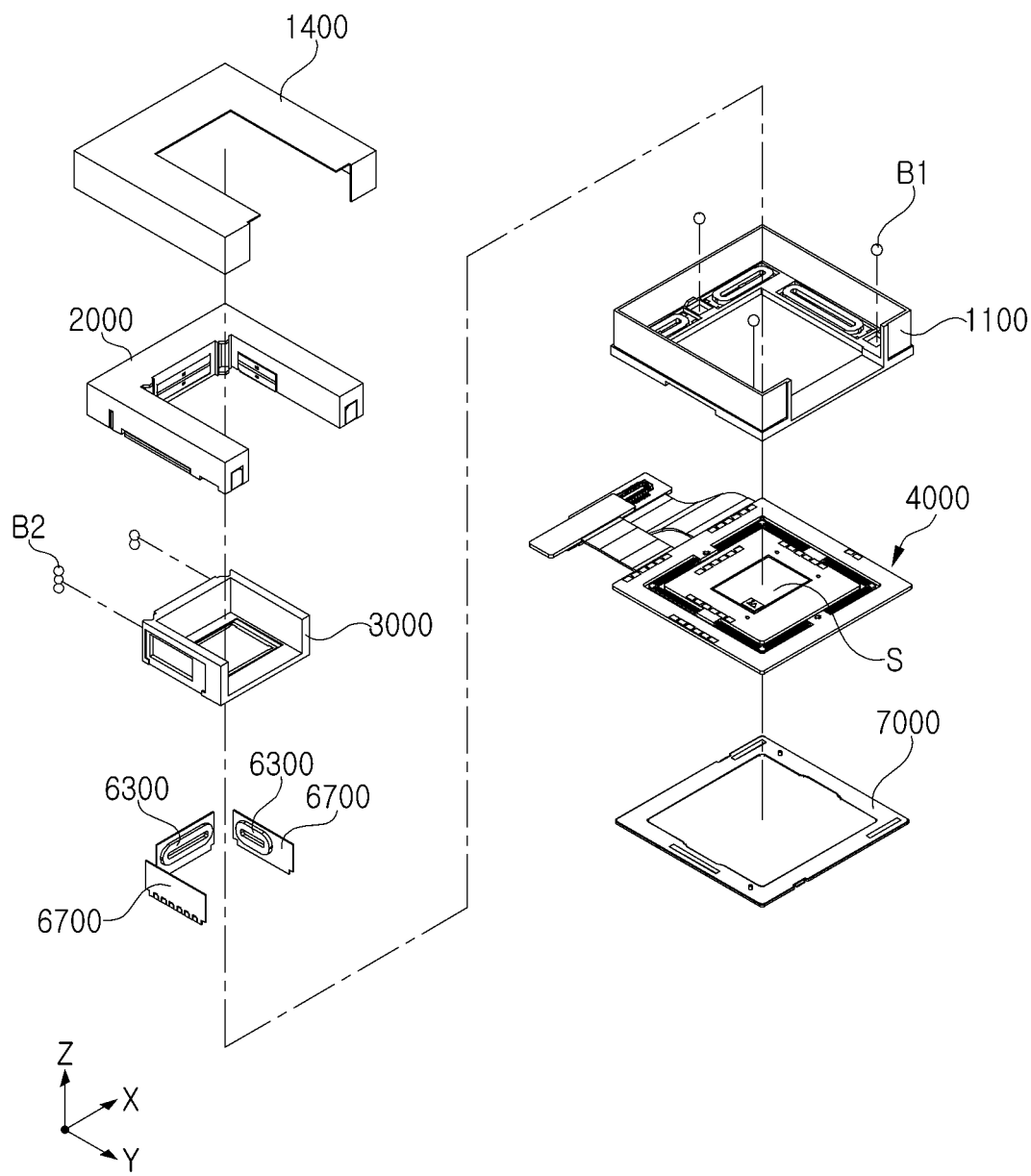
FIG. 19 is an exploded perspective diagram illustrating a camera module according to another example embodiment of the present disclosure.

FIG. 17 is a perspective diagram illustrating an actuator fora camera according to another example embodiment. FIG. 18 is a diagram illustrating an actuator for a camera according to another example embodiment. FIG. 19 is an exploded perspective diagram illustrating a camera module according to another example embodiment.

FIG. 18 illustrates the overall configuration of the actuator for a camera according to another example embodiment.

Referring to FIGS. 17 to 19, an actuator 10' for a camera (hereinafter referred to as "actuator") according to another example embodiment may move an image sensor S to perform autofocusing (AF) and optical image stabilization (OIS). Since the image sensor S having a relatively light weight moves, the image sensor S may move with a smaller driving force. Accordingly, the components included in the actuator 10' may be miniaturized.

The actuator 10' may include a housing 1100, a first carrier 2000 and a second carrier 3000.

The first carrier 2000 may be accommodated in the housing 1100 and may move in a direction perpendicular to the optical axis (Z-axis) with respect to the housing 1100. That is, the first carrier 2000 may be a fixed member not moving in the optical axis (Z-axis) direction during focus adjustment, but may be a moving member moving in the direction perpendicular to the optical axis (Z-axis) during optical image stabilization.

The second carrier 3000 may be accommodated in the first carrier 2000 and may move in the optical axis (Z-axis) direction with respect to the first carrier 2000. Also, since the second carrier 3000 is constrained such that the second carrier 3000 may not move relative to the first carrier 2000 in a direction perpendicular to the optical axis (Z-axis), when the first carrier 2000 moves in a direction perpendicular to the optical axis (Z-axis), the second carrier 3000 may move along with the first carrier 2000 in a direction perpendicular to the optical axis (Z-axis).

The image sensor S may be fixed with respect to the second carrier 3000 such that the image sensor S may move together with the second carrier 3000.

Accordingly, the image sensor S may move in the optical axis (Z-axis) direction together with the second carrier 3000 to adjust a focus, and the image sensor S may move along with the second carrier 3000 in a direction perpendicular to the optical axis (Z-axis) to perform optical image stabilization.

An infrared cut filter (IRCF) may be mounted on the second carrier 3000.

The actuator 10' may further include a case 1400. The case 1400 may be configured to protect the internal components of the actuator 10' by being combined with the housing 1100.

The image sensor S may be mounted on the sensor substrate 4000. A portion of the sensor substrate 4000 may be coupled to the second carrier 3000, and the other portion of the sensor substrate 4000 may be coupled to the housing 1100.

An image sensor S may be mounted on a portion of the sensor substrate 4000 coupled to the second carrier 3000.

Since a portion of the sensor substrate 4000 is coupled to the second carrier 3000, as the second carrier 3000 moves, a portion of the sensor substrate 4000 may also move along with the second carrier 3000.

Accordingly, the image sensor S may move in the optical axis (Z-axis) direction to adjust the focus, and may move in the direction perpendicular to the optical axis (Z-axis) to perform optical image stabilization.

Figure 20:
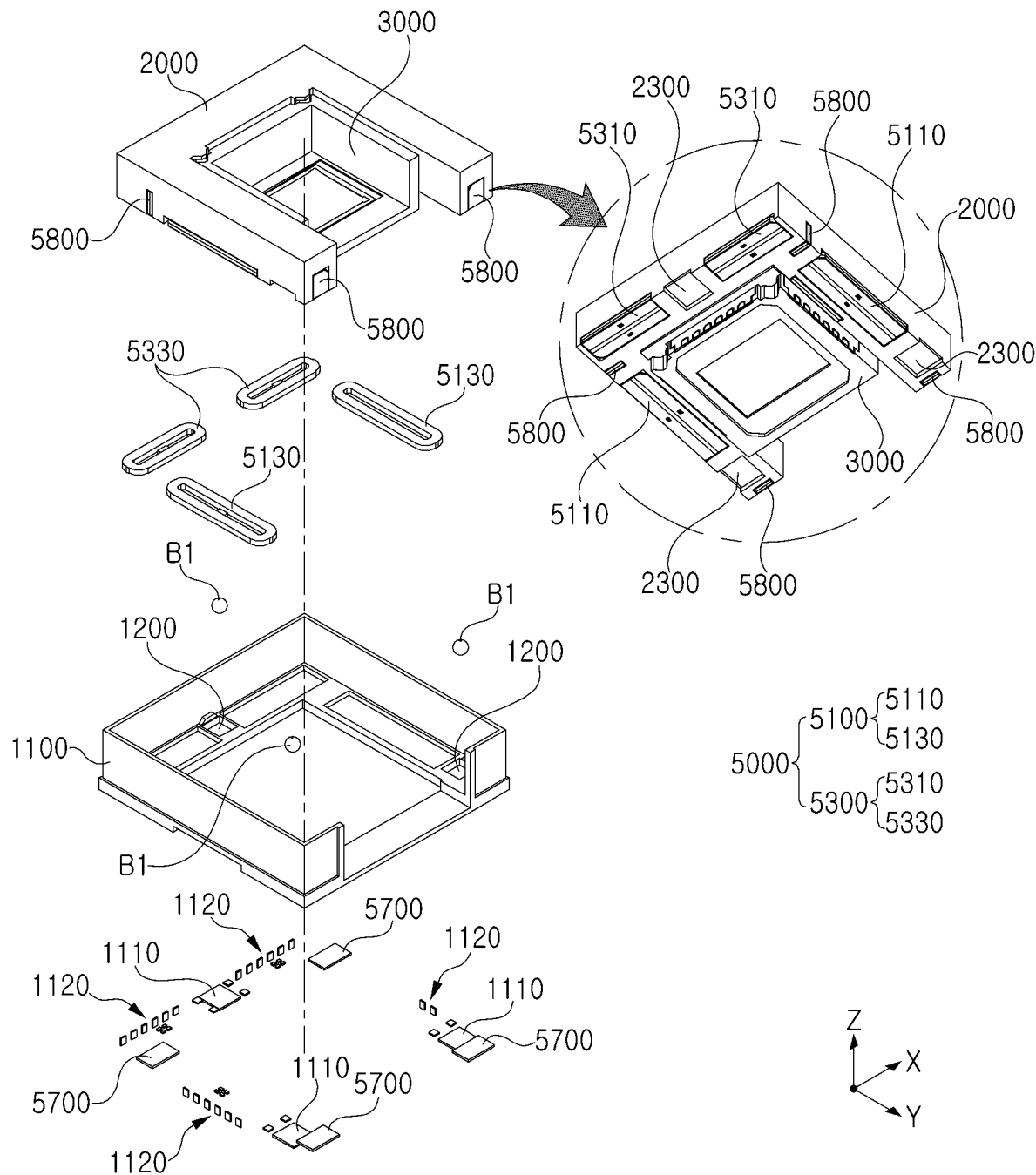
FIG. 20 is an exploded perspective diagram illustrating a housing, a first carrier, and a first driver of an actuator for a camera according to another example embodiment of the present disclosure.
Figure 21:
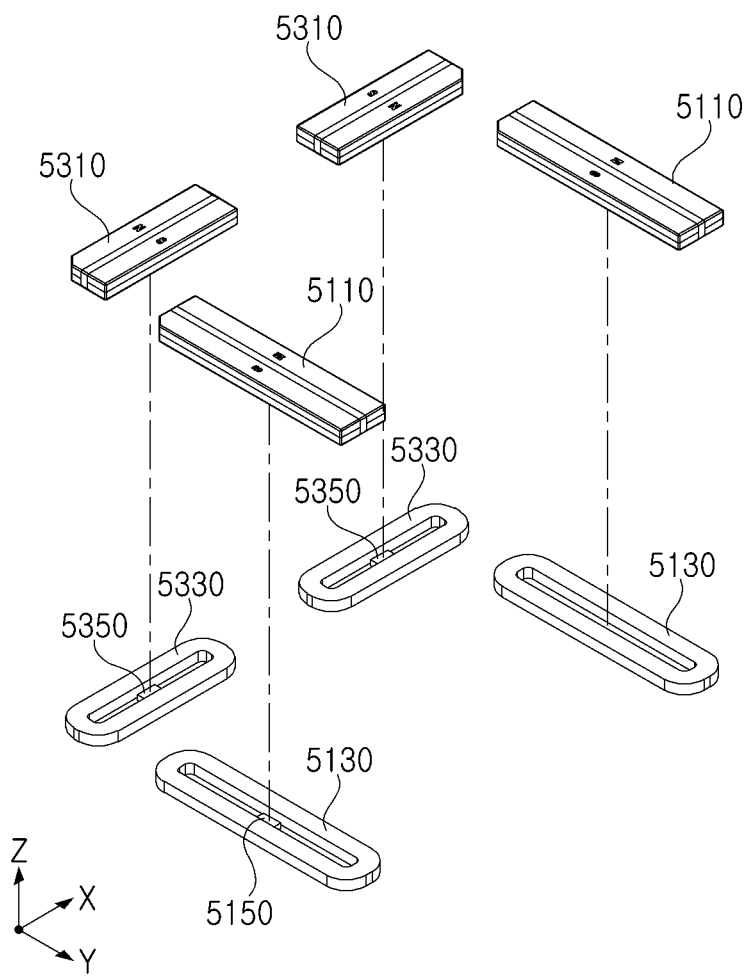
FIG. 21 is an exploded perspective diagram illustrating a first driver of an actuator for a camera according to another example embodiment of the present disclosure.
Figure 22:
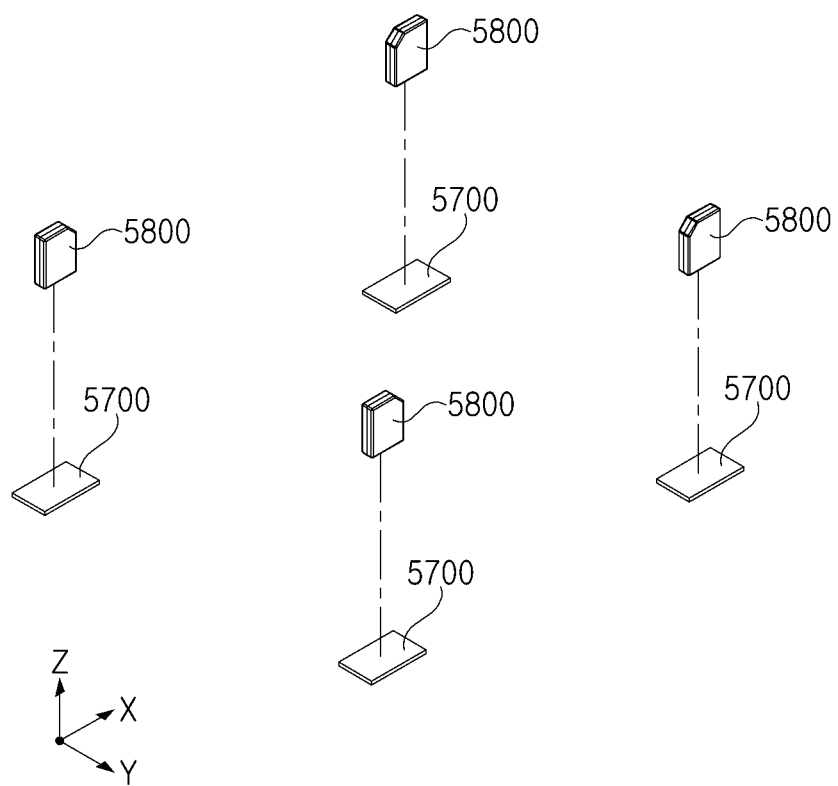
FIG. 22 is an exploded perspective diagram illustrating a pulling portion of an actuator for a camera according to another example embodiment of the present disclosure.

FIG. 20 is an exploded perspective diagram illustrating a housing, a first carrier, and a first driver of an actuator for a camera according to another example embodiment. FIG. 21 is an exploded perspective diagram illustrating a first driver of an actuator for a camera according to another example embodiment. FIG. 22 is an exploded perspective diagram illustrating a pulling portion of an actuator for a camera according to another example embodiment.

Figure 23:
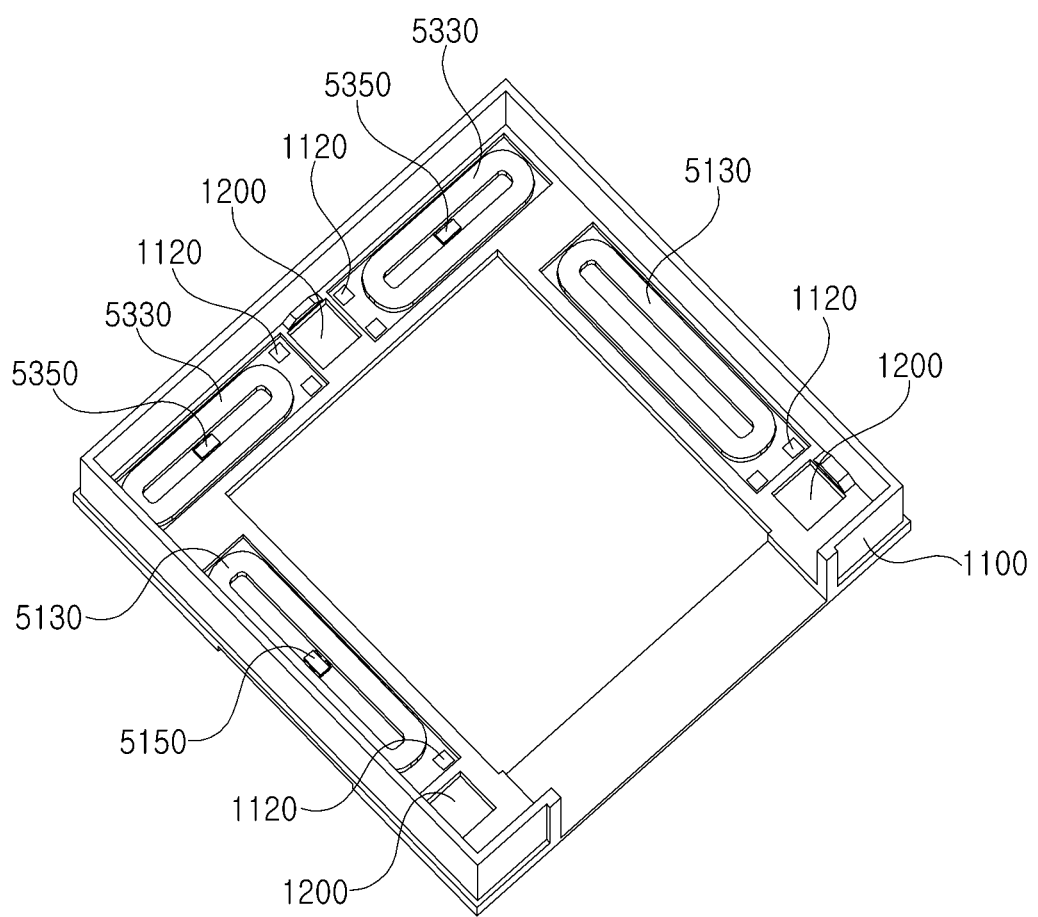
FIG. 23 is a perspective diagram illustrating a housing of an actuator for a camera according to another example embodiment of the present disclosure.
Figure 24:
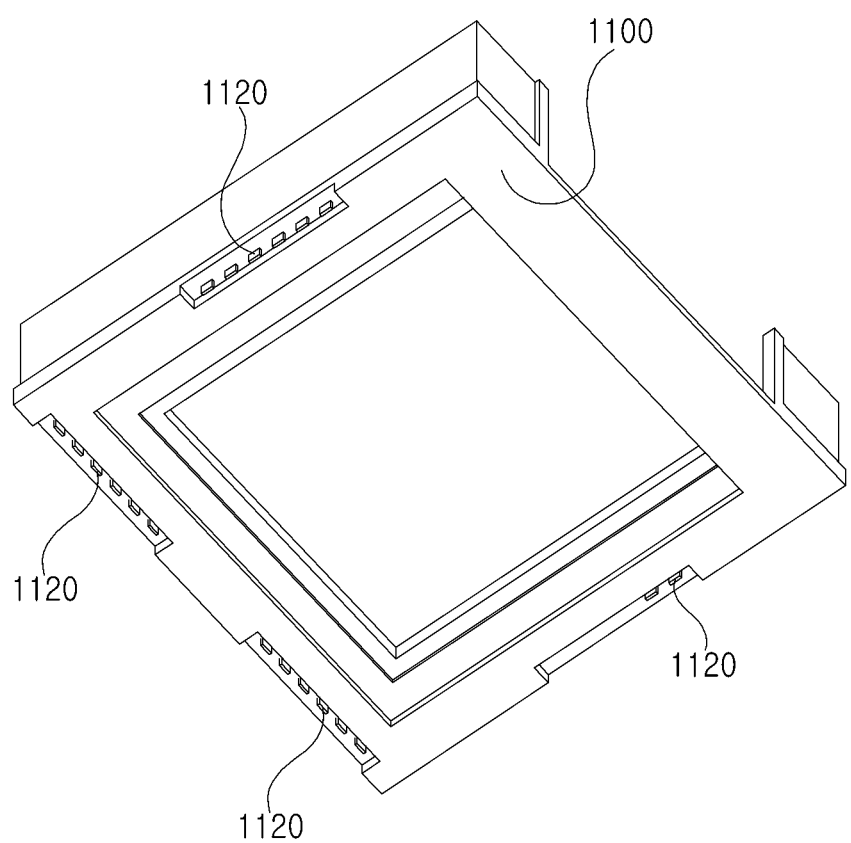
FIG. 24 is a perspective diagram illustrating the example in FIG. 23, viewed from below.

FIG. 23 is a perspective diagram illustrating a housing of an actuator for a camera according to another example embodiment. FIG. 24 is a perspective diagram illustrating the example in FIG. 23, viewed from below.

Referring to FIGS. 20 to 24, the first carrier 2000 may be disposed in the housing 1100. In the housing 1100, the first carrier 2000 may move relative to the housing 1100 in the first axis (X-axis) direction and the second axis (Y-axis) direction.

The first axis (X-axis) direction may refer to a direction perpendicular to the optical axis (Z-axis), and the second axis (Y-axis) direction may refer to a direction perpendicular to both the optical axis (Z-axis) direction and the first axis (X-axis) direction.

An actuator 10' according to another example embodiment may include a first driver 5000. The first driver 5000 may generate driving force in a direction perpendicular to the optical axis (Z-axis) to move the first carrier 2000 in a direction perpendicular to the optical axis (Z-axis).

The first driver 5000 may include a first sub-driver 5100 and a second sub-driver 5300. The first sub-driver 5100 may generate driving force in a first axis (X-axis) direction, and the second sub-driver 5300 may generate driving force in a second axis (Y-axis) direction.

The first sub-driver 5100 may include a first magnet 5110 and a first coil 5130. The first magnet 5110 and the first coil 5130 may be disposed to face each other in the optical axis (Z-axis) direction.

The first magnet 5110 may be disposed in the first carrier 2000. For example, the first magnet 5110 may be mounted on the bottom surface of the first carrier 2000. A mounting groove on which the first magnet 5110 is mounted may be provided on the bottom surface of the first carrier 2000. By inserting the first magnet 5110 into the mounting groove, the size of the actuator may be prevented from increasing due to the thickness of the first magnet 5110.

The first magnet 5110 may be magnetized such that one surface (e.g., a surface facing the first coil 5130) may have both an N pole and an S pole. For example, one surface of the first magnet 5110 facing the first coil 5130 may be provided with an N pole, a neutral region, and an S pole in order in a first axis (X-axis) direction. The first magnet 5110 may have a shape having a length in a second axis (Y-axis) direction.

The first coil 5130 may be disposed to face the first magnet 5110. For example, the first coil 5130 may be disposed to face the first magnet 5110 in the optical axis (Z-axis) direction. The first coil 5130 may have a donut shape having a hollow shape and may have a length in the second axis (Y-axis) direction.

The first coil 5130 may be disposed in the housing 1100. A mounting groove may be provided on the housing 1100, and the first coil 5130 may be disposed on the mounting groove of the housing 1100. By disposing the first coil 5130 in the mounting groove of the housing 1100, the size of the actuator 10' may be prevented from increasing due to the thickness of the first coil 5130.

The first magnet 5110 may include two magnets spaced apart from each other in the first axis (X-axis) direction, and the first coil 5130 may include two coils spaced apart from each other in the first axis (X-axis) direction. Each magnet of the first magnet 5110 and each coil of the first coil 5130 may face each other in the optical axis (Z-axis) direction.

During optical image stabilization, the first magnet 5110 may be a moving member mounted on the first carrier 2000 and moving together with the first carrier 2000, and the first coil 5130 may be a fixed member fixed to the housing 1100.

When power is applied to the first coil 5130, the first carrier 2000 may move in the first axis (X-axis) direction by electromagnetic force between the first magnet 5110 and the first coil 5130.

The first magnet 5110 and the first coil 5130 may generate driving force in a direction (e.g., the first axis (X-axis) direction) perpendicular to the direction (optical axis direction) in which the first magnet 5110 and the first coil 5130 face each other.

The second sub-driver 5300 may include a second magnet 5310 and a second coil 5330. The second magnet 5310 and the second coil 5330 may face each other in the optical axis (Z-axis) direction.

The second magnet 5310 may be disposed in the first carrier 2000. For example, the second magnet 5310 may be mounted on the bottom surface of the first carrier 2000. A mounting groove on which the second magnet 5310 is mounted may be provided on the bottom surface of the first carrier 2000. By inserting the second magnet 5310 into the mounting groove the size of the actuator 10' may be prevented from increasing due to the thickness of the second magnet 5310.

The second magnet 5310 may be magnetized such that one surface (e.g., a surface facing the second coil 5330) may have both an N pole and an S pole. For example, one surface of the second magnet 5310 facing the second coil 5330 may be provided with an N pole, a neutral region, and an S pole in order in the second axis (Y-axis) direction. The second magnet 5310 may have a shape having a length in a first axis (X-axis) direction.

The second coil 5330 may be disposed to face the second magnet 5310. For example, the second coil 5330 may be disposed to face the second magnet 5310 in the optical axis (Z-axis) direction. The second coil 5330 may have a donut shape having a hollow shape and may have a length in a first axis (X-axis) direction.

The second coil 5330 may be disposed in the housing 1100. A mounting groove may be provided on the housing 1100, and the second coil 5330 may be disposed on the mounting groove of the housing 1100. By placing the second coil 5330 in the mounting groove of the housing 1100, the size of the actuator 10' may be prevented from increasing due to the thickness of the second coil 5330.

The second magnet 5310 may include two magnets spaced apart from each other in the first axis (X-axis) direction, and the second coil 5330 may include two coils spaced apart from each other in the first axis (X-axis) direction. Each magnet of the second magnet 5310 and each coil of the second coil 5330 may face each other in the optical axis (Z-axis) direction.

During optical image stabilization, the second magnet 5310 may be a moving member mounted on the first carrier 2000 and moving together with the first carrier 2000, and the second coil 5330 may be a fixed member fixed to the housing 1100.

When power is applied to the second coil 5330, the first carrier 2000 may move in the second axis (Y-axis) direction by electromagnetic force between the second magnet 5310 and the second coil 5330.

The second magnet 5310 and the second coil 5330 may generate driving force in a direction (e.g., second axis (Y-axis) direction) perpendicular to the direction (the optical axis direction) in which the second magnet 5310 and the second coil 5330 face each other.

Also, the first carrier 2000 may be rotated by generating a deviation in one or more of the magnitude of the driving force in the first axis (X-axis) direction and the magnitude of the driving force in the second axis (Y-axis) direction.

A first ball member B1 may be disposed between the housing 1100 and the first carrier 2000.

The first ball member B1 may be disposed to be in contact with the housing 1100 and the first carrier 2000.

The first ball member B1 may guide the movement of the first carrier 2000 in the process of optical image stabilization, and may also maintain a distance between the housing 1100 and the first carrier 2000 in the optical axis (Z-axis) direction.

When the first carrier 2000 moves in a direction perpendicular to the optical axis (Z-axis) relative to the housing 1100, the first ball member B1 may guide the movement of the first carrier 2000 by rolling in a direction perpendicular to the optical axis (Z-axis).

For example, the first ball member B1 may roll in the first axis (X-axis) direction when driving force in the first axis (X-axis) direction is generated. Accordingly, the first ball member B1 may guide the movement of the first carrier 2000 in the first axis (X-axis) direction.

Also, the first ball member B1 may roll in the second axis (Y-axis) direction when driving force in the second axis (Y-axis) direction is generated. Accordingly, the first ball member B1 may guide the movement of the first carrier 2000 in the second axis (Y-axis) direction.

The first ball member B1 may include a plurality of balls disposed between the housing 1100 and the first carrier 2000. The number of balls included in the first ball member B1 may be three or more.

A guide groove on which the first ball member B1 is disposed may be disposed on at least one of the surfaces of the housing 1100 and the first carrier 2000 facing each other in the optical axis (Z-axis) direction. For example, the first guide groove 2300 may be disposed on the bottom surface of the first carrier 2000, and the second guide groove 1200 may be disposed on the bottom surface of the inner side of the housing 1100.

The first ball member B1 may be disposed in the first guide groove 2300 and the second guide groove 1200 and may be interposed between the housing 1100 and the first carrier 2000.

In a state in which the first ball member B1 is accommodated in the first guide groove 2300 and the second guide groove 1200, the movement in the optical axis (Z-axis) direction may be restricted, and the first ball member B1 may move in a direction perpendicular to the optical axis (Z-axis).

A plane of each of the first guide groove 2300 and the second guide groove 1200 may have a polygonal or circular shape. The sizes of the first guide groove 2300 and the second guide groove 1200 may be larger than the diameter of the first ball member B1. For example, cross-sectional surfaces of the first guide groove 2300 and the second guide groove 1200 on a plane perpendicular to the optical axis (Z-axis) may have a size larger than the diameter of the first ball member B1.

Meanwhile, a support pad 1110 may be provided in the housing 1100, and at least a portion of the support pad 1110 may form a bottom surface of the second guide groove 1200. Accordingly, the first ball member B1 may roll while being in contact with the support pad 1110.

The support pad 1110 may be integrated with the housing 1100 by insert injection. In this case, the support pad 1110 may be manufactured to be integrated with the housing 1100 by injecting a resin material into the mold while the support pad 1110 is fixed to the mold. The support pad 1110 may be formed of a stainless material.

The support pad 1110 may also be provided in the first carrier 2000.

The actuator 10' according to another example embodiment may sense a position in a direction perpendicular to the optical axis (Z-axis) of the first carrier 2000.

To this end, a first position sensor 5150 and a second position sensor 5350 may be provided. The first position sensor 5150 may be disposed in the housing 1100 to face the first magnet 5110, and the second position sensor 5350 may be disposed in the housing 1100 to face the second magnet 5310.

Each of the first position sensor 5150 and the second position sensor 5350 may include one or more Hall sensors.

For example, the first position sensor 5150 may include a Hall sensor. In this case, the Hall sensor may be disposed to face one of a plurality of magnets of the first magnet 5110 in the optical axis (Z-axis) direction.

The second position sensor 5350 may include two Hall sensors. The two Hall sensors of the second position sensor 5350 may be spaced apart from each other in the first axis (X-axis) direction. The two Hall sensors of the second position sensor 5350 may face the two magnets of the second magnet 5310 in the optical axis (Z-axis) direction.

Whether the first carrier 2000 rotates may be sensed through two Hall sensors facing the second magnet 5310.

Rotational force may be intentionally generated by generating a deviation between the driving force of the first sub-driver 5100 and the driving force of the second sub-driver 5300, using the resultant force of the first sub-driver 5100 and the second sub-driver 5300, or using two magnets included in the second sub-driver 5300.

Since the first guide groove 2300 and the second guide groove 1200 have a polygonal or circular shape larger than the diameter of the first ball member B1, the first ball member B1 may roll in several directions perpendicular to the optical axis (Z-axis).

Accordingly, the first carrier 2000 may rotate with respect to the optical axis (Z-axis) while being supported by the first ball member B1.

For ease of description, it has been described that the first carrier 2000 may rotate with the optical axis (Z-axis) as the rotation axis, but when the first carrier 2000 rotates, the rotation axis thereof may not coincide with the optical axis (Z-axis). For example, the first carrier 2000 may rotate using an arbitrary axis parallel to the direction in which the imaging plane of the image sensor S faces as a rotation axis.

Also, when rotation is not required and linear movement is required, the driving force of the first sub-driver 5100 and/or the driving force of the second sub-driver 5300 may be controlled to offset the rotational force generated unintentionally.

The actuator 10' according to another example embodiment may include a pulling portion providing attractive force such that the housing 1100 and the first carrier 2000 may maintain to be in contact with the first ball member B1.

The pulling portion may include a first yoke 5700 and a pulling magnet 5800.

The first yoke 5700 may be disposed in the housing 1100. For example, the first yoke 5700 may be buried in the housing 1100. The first yoke 5700 may be integrated with the housing 1100 by insert molding. In this case, the first yoke 5700 may be integrated with the housing 1100 by injecting a resin material into the mold while the first yoke 5700 is fixed to the mold.

The pulling magnet 5800 may be disposed in the first carrier 2000. The first yoke 5700 and the pulling magnet 5800 may face each other in the optical axis (Z-axis) direction.

Attractive force may act between the first yoke 5700 and the pulling magnet 5800 in the optical axis (Z-axis) direction.

Accordingly, since the first carrier 2000 is pressed in a direction toward the housing 1100, the housing 1100 and the first carrier 2000 may maintain to be in contact with the first ball member B1.

Due to this attractive force, the first carrier 2000 may form a three-point support for the first ball member B1.

The first yoke 5700 may be a material for generating attractive force with respect to the pulling magnet 5800. For example, the first yoke 5700 may be formed of a magnetic material.

The number of first yokes 5700 and the number of pulling magnets 5800 are not limited to any particular example, and the center of attraction acting between the first yokes 5700 and the pulling magnets 5800 may need to be positioned within the support region connecting the plurality of balls included in the first ball member B1 to each other.

As another example embodiment, a first yoke 5700 may be disposed to face the first magnet 5110 and the second magnet 5310 in the optical axis (Z-axis) direction without disposing a pulling magnet 5800.

Referring to FIGS. 20, 23 and 24, the first coil 5130 and the second coil 5330 may be disposed in the housing 1100, and a wiring pattern 1120 may be disposed in the housing 1100. The wiring pattern 1120 may be connected to the first coil 5130 and the second coil 5330.

The wiring pattern 1120 of the housing 1100 may also be connected to the sensor substrate 4000. Accordingly, the first coil 5130 and the second coil 5330 may receive power through the wiring pattern 1120 disposed on the housing 1100.

That is, a wiring pattern 1120 may be provided in the housing 1100 such that power may be supplied to the first driver 5000), rather than disposing a printed circuit board for supplying power to the first driver 5000 in the housing 1100.

The wiring pattern 1120 may be integrated with the housing 1100 by insert molding. For example, the wiring pattern 1120 may be integrated with the housing 1100 by injecting a resin material into the mold while the wiring pattern 1120 is disposed in the mold.

A portion of the wiring pattern 1120 may be exposed to the outside from the inner side bottom surface of the housing 1100, and the exposed portion may be connected to the first coil 5130 and the second coil 5330.

The other portion of the wiring pattern 1120 may be exposed to the outside from the outer bottom surface of the housing 1100, and the exposed portion may be connected to the sensor substrate 4000.

Since the wiring pattern 1120 is connected to the sensor substrate 4000, power may be applied to the first coil 5130 and the second coil 5330 through the wiring pattern 1120.

The configuration of the sensor substrate 4000 and the base 7000 is the same as that of the sensor substrate 400 and the base 700 in the example embodiment, and accordingly, a further detailed description thereof will not be provided.

Figure 25:
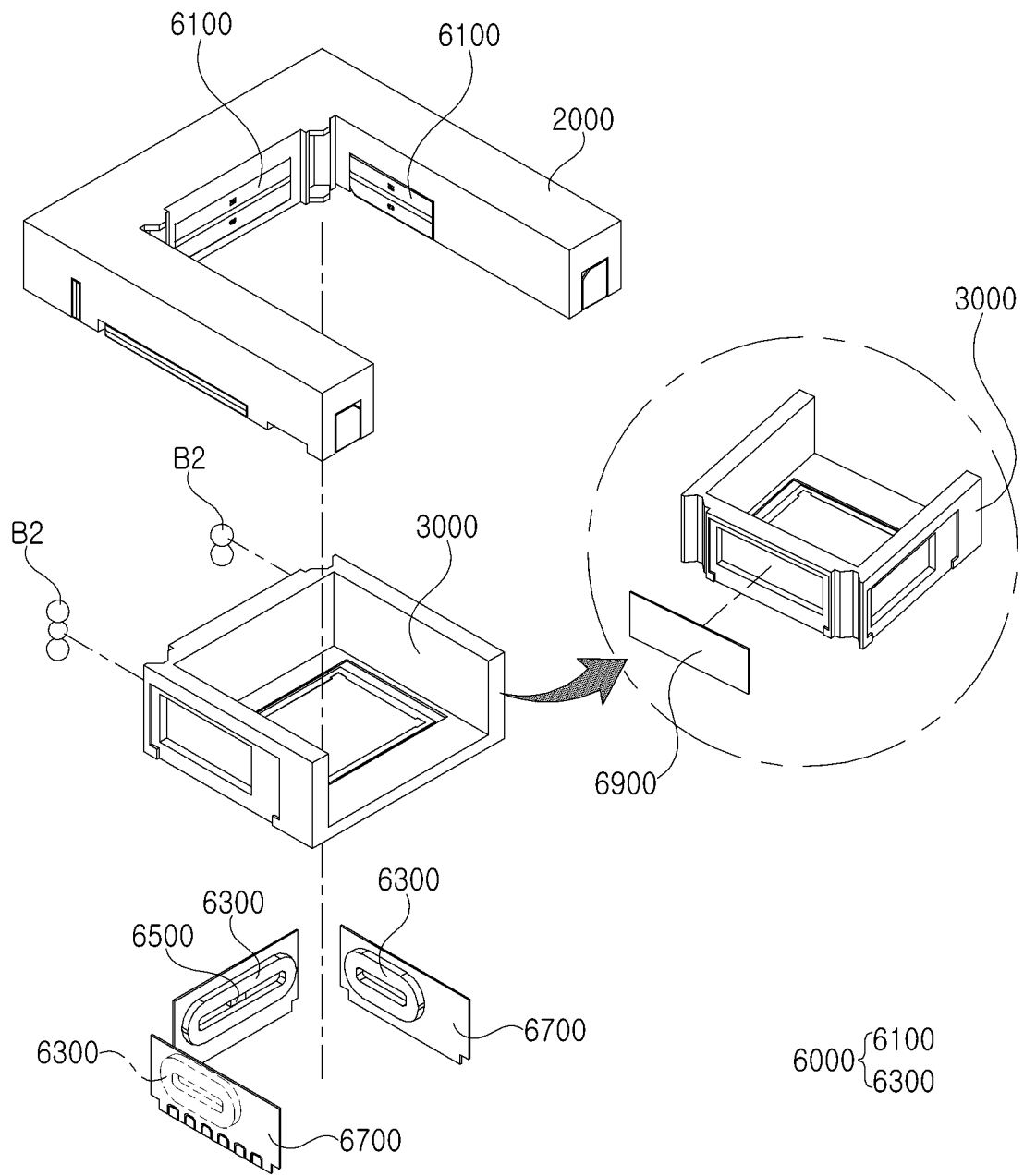
FIG. 25 is an exploded perspective diagram illustrating a first carrier, a second carrier, and a second driver of an actuator for a camera according to another example embodiment of the present disclosure.
Figure 26:
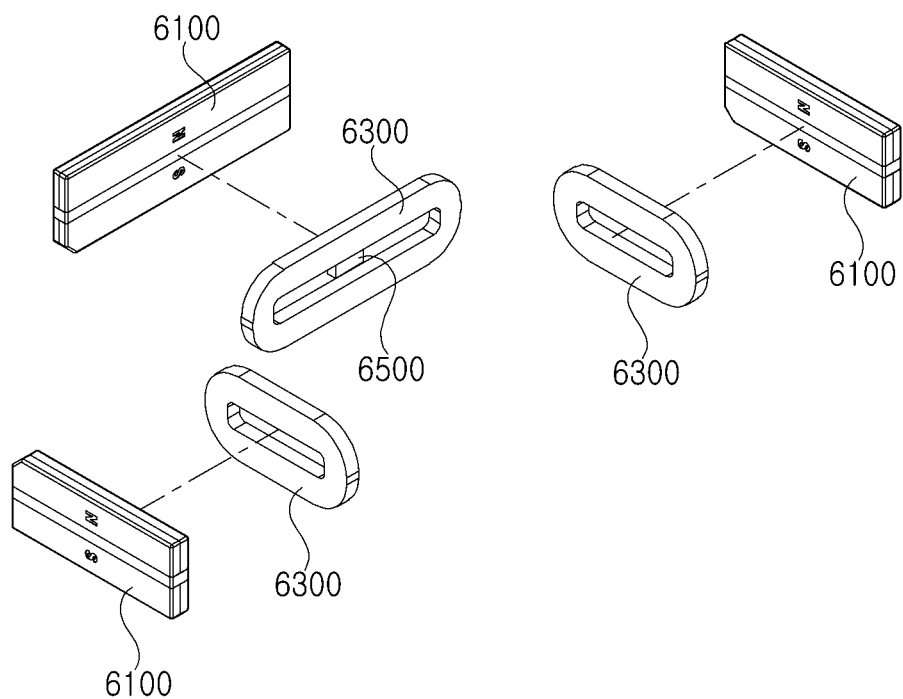
FIG. 26 is a perspective diagram illustrating a second driver of an actuator for a camera according to another example embodiment of the present disclosure.

FIG. 25 is an exploded perspective diagram illustrating a first carrier, a second carrier, and a second driver of an actuator for a camera according to another example embodiment. FIG. 26 is a perspective diagram illustrating a second driver of an actuator for a camera according to another example embodiment.

Figure 27:
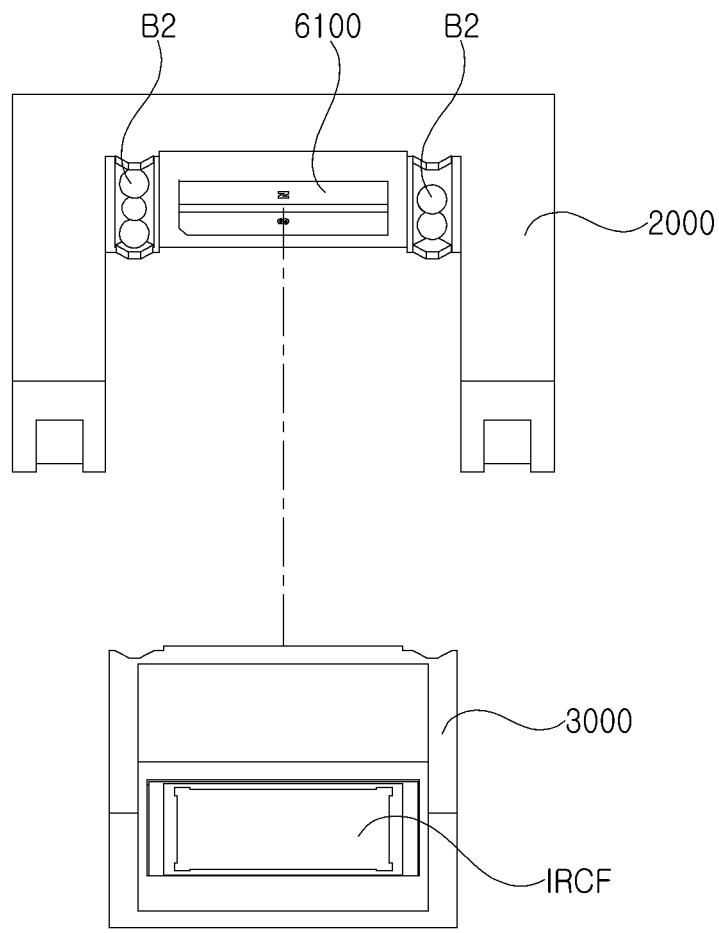
FIG. 27 is a perspective diagram illustrating a first carrier and a second carrier of an actuator for a camera according to another example embodiment of the present disclosure.
Figure 28:
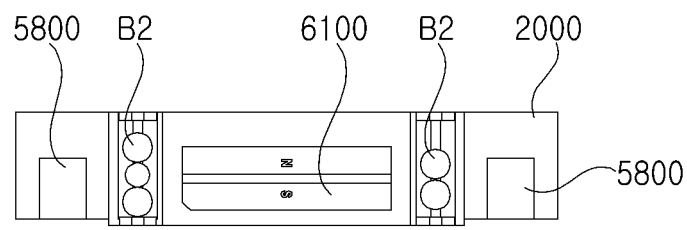
FIG. 28 is a diagram illustrating a first carrier of an actuator for a camera according to another example embodiment of the present disclosure, viewed in a second axis direction.

FIG. 27 is a perspective diagram illustrating a first carrier and a second carrier of an actuator for a camera according to another example embodiment. FIG. 28 is a diagram illustrating a first carrier of an actuator for a camera according to another example embodiment, viewed in a second axis direction.

Referring to FIGS. 25 to 28, the second carrier 3000 may be accommodated in the first carrier 2000.

The second carrier 3000 may be disposed in the first carrier 2000 and may move along with the first carrier 2000 in a direction perpendicular to the optical axis (Z-axis), and may move relative to the first carrier 2000 in the optical axis (Z-axis) direction.

The second driver 6000 may generate driving force in the optical axis (Z-axis) direction to move the second carrier 3000 in the optical axis (Z-axis) direction.

The second driver 6000 may include a third magnet 6100 and a third coil 6300. The third magnet 6100 and the third coil 6300 may be disposed to face each other in a direction perpendicular to the optical axis (Z-axis).

The third magnet 6100 may be disposed in the first carrier 2000. For example, the third magnet 6100 may be disposed on the inner side surface of the first carrier 2000.

The third magnet 6100 may be magnetized such that one surface (e.g., a surface facing the third coil 6300) may have both an N pole and an S pole. For example, one surface of the third magnet 6100 facing the third coil 6300 may be provided with an N pole, a neutral region, and an S pole in order in the optical axis (Z-axis) direction.

The third coil 6300 may be disposed on the second carrier 3000. For example, the third coil 6300 may be disposed on the outer side surface of the second carrier 3000. The third coil 6300 may be disposed to face the third magnet 6100 in a direction perpendicular to the optical axis (Z-axis).

The third coil 6300 may be disposed on the first substrate 6700, and the first substrate 6700 may be mounted on the second carrier 3000 such that the third magnet 6100 and the third coil 6300 may face each other in a direction perpendicular to the optical axis (Z-axis).

Power may be supplied to the second driver 6000 through the wiring pattern by insert-injecting a wiring pattern together with the second carrier 3000 without disposing the first substrate 6700 on the second carrier 3000.

During focus adjustment, the third magnet 6100 may be a fixed member fixed to the first carrier 2000, and the third coil 6300 may be a moving member mounted on the first substrate 6700 and the second carrier 3000 and moving in the optical axis (Z-axis) direction together with the second carrier 3000.

When power is applied to the third coil 6300, the second carrier 3000 may move in the optical axis (Z-axis) direction by electromagnetic force between the third magnet 6100 and the third coil 6300.

Since the second carrier 3000 may be coupled to the sensor substrate 4000 on which the image sensor S is mounted, the movement of the second carrier 3000 may also move the image sensor S in the optical axis (Z-axis) direction.

The second ball member B2 may be disposed between the first carrier 2000 and the second carrier 3000. The second ball member B2 may include a plurality of balls disposed in the optical axis (Z-axis) direction. A plurality of balls may roll in the optical axis (Z-axis) direction when the second carrier 3000 moves in the optical axis (Z-axis) direction.

A second yoke 6900 may be disposed in the second carrier 3000. The second yoke 6900 may be disposed in a position facing the third magnet 6100. For example, a second yoke 6900 may be mounted on an outer side surface of the second carrier 3000, and a first substrate 6700 on which a third coil 6300 is disposed may be coupled to the outer side surface of the second carrier 3000.

The third magnet 6100 and the second yoke 6900 may generate attractive forces with each other. For example, attractive force may act between the third magnet 6100 and the second yoke 6900 in a direction perpendicular to the optical axis (Z-axis).

The second ball member B2 may be in contact with the first carrier 2000 and the second carrier 3000 by attractive force of the third magnet 6100 and the second yoke 6900.

The third magnet 6100 may include three magnets disposed in a '☐' shape, and the third coil 6300 may include three coils disposed in a '☐' shape.

However, in an example embodiment, the third magnet 6100 may include a magnet and the third coil 6300 may include a coil. In this case, the magnet and the coil may be disposed to face each other in a direction in which attractive force acts between the magnet and the second yoke 6900.

Guide grooves may be disposed on surfaces on which the first carrier 2000 and the second carrier 3000 face each other. The configuration of the guide groove and the configuration of the second ball member B2 are the same as those of the guide groove and the second ball member of the actuator 10 for a camera in the example embodiment described above, and accordingly, a further detailed description thereof will not be provided.

The actuator 10' may detect the position of the second carrier 3000 in the optical axis (Z-axis) direction.

To this end, a third position sensor 6500 may be provided. The third position sensor 6500 may be disposed on the first substrate 6700 to face the third magnet 6100. The third position sensor 6500 may be a Hall sensor.

Figure 29:
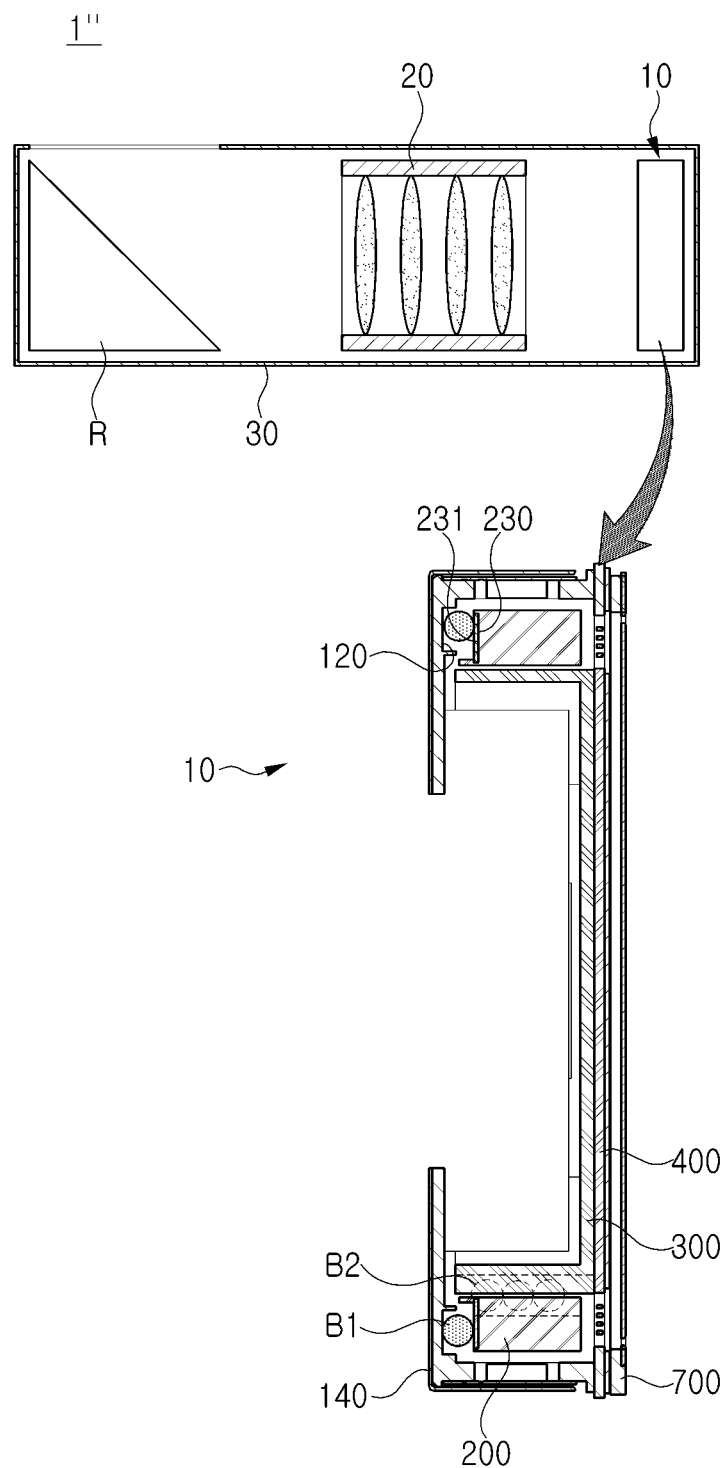
FIGS. 29 and 30 are cross-sectional diagrams illustrating a camera module according to another example embodiment of the present disclosure.

FIG. 29 is a cross-sectional diagram illustrating a camera module according to another example embodiment.

Referring to FIG. 29, a camera module 1" in another example embodiment may include a housing 30, a reflective module R, a lens module 20 and an actuator 10.

Although the actuator 10 is illustrated in FIG. 29, the actuator 10' may be included.

In this example embodiment, the optical axis (Z-axis) of the lens module 20 may be directed to the direction perpendicular to the thickness direction (the direction from the front surface of the portable electronic device to the rear surface or vice versa) of a portable electronic device direction.

For example, the optical axis (Z-axis) of the lens module 20 may be formed in a width direction or a length direction of a portable electronic device.

When the components included in the camera module are stacked in the thickness direction of the portable electronic device, the thickness of the portable electronic device may increase.

However, in the camera module 1" in the example embodiment, since the optical axis (Z-axis) of the lens module 20 is formed in the width direction or length direction of the portable electronic device, the thickness of the portable electronic device may be reduced.

A reflective module R and a lens module 20 may be disposed in the housing 30. For example, the reflective module R and lens module 20 may be fixed to the housing 30. Alternatively, the reflective module R and lens module 20 may be disposed in different housings, and the housings may be combined with each other.

The reflective module R may be configured to change a traveling direction of light. For example, the traveling direction of light incident into the housing 30 may be changed toward the lens module 20 through the reflective module R. The reflective module R may be a mirror or prism for reflecting light.

The actuator 10 may be accommodated in the housing 30 and may be disposed on the rear side of the lens module 20. As another example, the actuator 10 may be coupled to the rear end of the housing 30.

In the example embodiment, the lens module 20 may not be coupled to the housing 110 of the actuator 10, and may be accommodated in the housing 30 of the camera module 1". Accordingly, the housing 110 of the actuator 10 in the example embodiment may not have a portion coupled to the lens module 20. The configuration of other actuators 10 may be the same as that of the actuator 10 in the example embodiment described above.

An image sensor S may be disposed in the actuator 10, and the image sensor S may move in a first axis (X-axis) direction and a second axis (Y-axis) direction, or may rotate with the optical axis (Z-axis) as the rotation axis. Also, the image sensor S may move in the optical axis (Z-axis) direction.

Accordingly, optical image stabilization and focus adjustment may be performed by moving the image sensor S.

Figure 30:
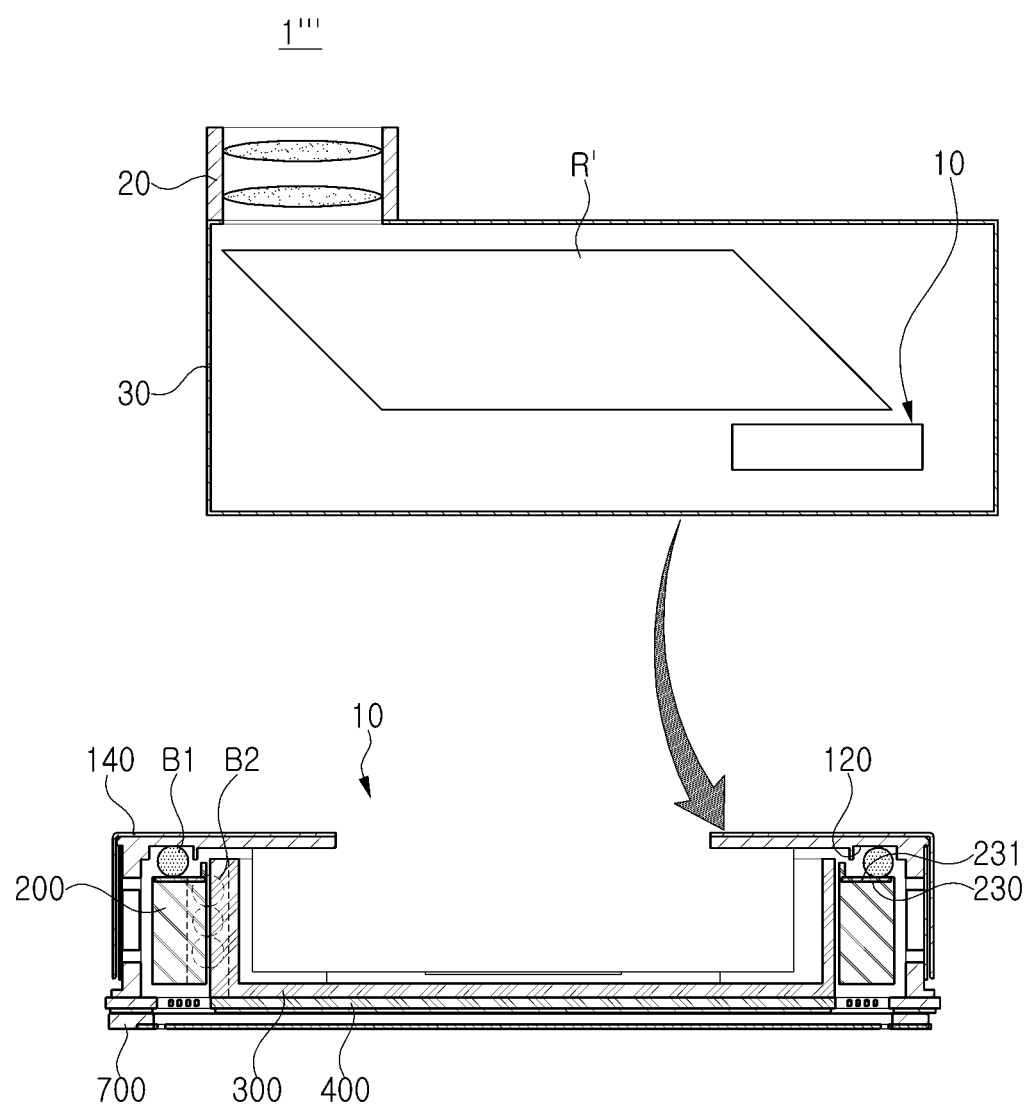

FIG. 30 is a cross-sectional diagram illustrating a camera module according to another example embodiment.

Referring to FIG. 30, a camera module 1''' in another example embodiment may include a housing 30, a reflective module R', a lens module 20 and an actuator 10.

The actuator 10 is illustrated in FIG. 30, or the actuator 10' may be included.

A reflective module R' and an actuator 10 may be accommodated in the housing 30. As another example, the actuator 10 may be coupled to the housing 30 on the outside of the housing 30.

The reflective module R' may be configured to change the traveling direction of light multiple times. For example, the traveling direction of the light incident into the housing 30 may be changed two or more times through the reflective module R'. To this end, the reflective module R' may include two or more reflective surfaces. For example, a cross-sectional surface of the reflective module R' may have a parallelogram shape.

The reflective module R' may be a mirror or a prism for reflecting light multiple times.

Since light is reflected multiple times by the reflective module R' until light is received by the image sensor S, a light path may be elongated in a limited space. Accordingly, the camera module 1''' may be miniaturized.

The lens module 20 may be disposed on the front side of the reflective module R'. For example, the lens module 20 may be disposed closer to the object side than the reflective module R'.

The optical axis (Z-axis) of the lens module 20 may be directed in the thickness direction of the portable electronic device.

In this example embodiment, the lens module 20 may not be coupled to the housing 110 of the actuator 10, and may be accommodated in the housing 30 of the camera module 1'''. Accordingly, the housing 110 of the actuator 10 in the example embodiment may not have a portion coupled to the lens module 20. The configuration of other actuators 10 may be the same as that of the actuator 10 in an example embodiment described above.

An image sensor S may be disposed in the actuator 10, and the image sensor S may move in a first axis (X-axis) direction and a second axis (Y-axis) direction, or may rotate with the optical axis (Z-axis) as the rotation axis. Also, the image sensor S may move in the optical axis (Z-axis) direction.

Accordingly, optical image stabilization and focus adjustment may be performed by moving the image sensor S.

According to the aforementioned example embodiments, the actuator for a camera may improve performance of focus adjustment and optical image stabilization.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator for a camera, comprising:
a housing comprising an internal space;
a first carrier accommodated in the housing;
a second carrier accommodated in the first carrier; and
an image sensor fixed relative to the second carrier,
wherein the first carrier and the second carrier are configured to move together in a direction parallel to an imaging plane of the image sensor, and
wherein the second carrier is configured to move relative to the first carrier in a direction perpendicular to the imaging plane of the image sensor.

2. The actuator for a camera of claim 1, further comprising:
a first driver comprising a plurality of magnets and a plurality of coils,
wherein the plurality of magnets are disposed on the first carrier.

3. The actuator for a camera of claim 2,
wherein the first driver comprises a first sub-driver comprising a first magnet and a first coil and a second sub-driver comprising a second magnet and a second coil,
wherein the first sub-driver generates driving force in a direction in which the first magnet and the first coil face each other, and
wherein the second sub-driver generates driving force in a direction in which the second magnet and the second coil face each other.

4. The actuator for a camera of claim 3,
wherein the first magnet comprises a plurality of magnets spaced apart from each other in a first axis direction parallel to the imaging plane, and each of the plurality of magnets has a length in a second axis direction perpendicular to the first axis direction and parallel to the imaging plane, and
wherein the first sub-driver comprises a hall sensor disposed to face the first magnet.

5. The actuator for a camera of claim 3,
wherein the second magnet comprises a plurality of magnets spaced apart from each other in a first axis direction parallel to the imaging plane, and each of the plurality of magnets has a length in the first axis direction, and
wherein the second sub-driver comprises a hall sensor disposed to face the second magnet.

6. The actuator for a camera of claim 1, further comprising:
a first ball member disposed between the housing and the first carrier,
wherein a guide groove on which the first ball member is disposed is provided on at least one of surfaces of the housing and the first carrier facing each other in a direction perpendicular to the imaging plane.

7. The actuator for a camera of claim 6, further comprising:
a first driver comprising a plurality of magnets and a plurality of coils,
wherein the plurality of magnets are disposed on the first carrier, and
wherein a first yoke is disposed in the housing to face the plurality of magnets in a direction perpendicular to the imaging plane.

8. The actuator for a camera of claim 6, wherein a support pad is disposed on a bottom surface of the guide groove, and a material of the support pad is different from a material of the housing and a material of the first carrier.

9. The actuator for a camera of claim 1,
wherein the housing comprises a plurality of damping grooves, and the first carrier comprises a plurality of damping pins extending toward the plurality of damping grooves, and
wherein a damping gel is disposed in the plurality of damping grooves, and at least a portion of each of the plurality of damping pins is disposed in the damping gel.

10. The actuator for a camera of claim 1, further comprising:
a second driver comprising a third magnet disposed on the first carrier and a third coil disposed on the second carrier.

11. The actuator for a camera of claim 10, wherein a substrate is disposed on the second carrier, and the third coil is disposed on one surface of the substrate.

12. The actuator for a camera of claim 10, further comprising:
a second ball member disposed between the first carrier and the second carrier,
wherein the second ball member comprises a first ball group and a second ball group spaced apart from each other in a direction parallel to the imaging plane, and
wherein the first ball group comprises two or more balls disposed in a direction perpendicular to the imaging plane, and the second ball group comprises fewer balls than those of the first ball group.

13. The actuator for a camera of claim 12, wherein a second yoke facing the third magnet is disposed on the second carrier.

14. The actuator for a camera of claim 13, wherein an auxiliary yoke is disposed on an inner side of the third coil, and the auxiliary yoke is disposed closer to the first ball group than to the second ball group.

15. The actuator for a camera of claim 1, further comprising:
a sensor substrate comprising a moving portion on which the image sensor is disposed, a fixed portion mounted on the housing, and a connection portion connecting the moving portion to the fixed portion, wherein the connection portion extends along a circumference of the moving portion, and
wherein the moving portion is coupled to the second carrier.

16. The actuator for a camera of claim 15,
wherein the connection portion comprises a first support portion and a second support portion,
wherein the first support portion has one side connected to the fixed portion and the other side spaced apart from the moving portion, and
wherein the second support portion has one side connected to the moving portion and the other side spaced apart from the fixed portion.

17. The actuator for a camera of claim 15,
wherein the moving portion comprises a through-hole penetrating through the moving portion in a direction perpendicular to the imaging plane,
wherein the image sensor is disposed in the through-hole, and
wherein a reinforcement plate is mounted on a lower surface of the moving portion.

18. A camera module comprising:
the actuator for a camera of claim 1; and
a lens module coupled to the housing and fixed relative to the housing.

19. A portable electronic device comprising:
a camera module comprising:
the actuator for a camera of claim 1; and
a lens module coupled to the housing.

20. An actuator for a camera, comprising:
a housing;
a first carrier accommodated in the housing;
a second carrier accommodated in the first carrier;
an image sensor fixed relative to the second carrier;
a first driver comprising a first magnet and a second magnet disposed on the first carrier, and a first coil and a second coil disposed on the housing; and
a second driver comprising a third magnet disposed on one of the first carrier and the second carrier, and a third coil disposed on the other of the first carrier and the second carrier,
wherein the first carrier, the second carrier, and the second driver are configured to move together in a direction parallel to an imaging plane of the image sensor.

21. The actuator for a camera of claim 20, wherein the second carrier is configured to move relative to the first carrier in a direction perpendicular to the imaging plane of the image sensor.

22. The actuator for a camera of claim 20, further comprising:
a sensor substrate comprising a moving portion on which the image sensor is disposed, a fixed portion mounted on the housing, and a connection portion connecting the moving portion and the fixed portion,
wherein the moving portion is coupled to the second carrier.

23. The actuator for a camera of claim 22, further comprising:
a first substrate disposed in the housing and a second substrate disposed in the second carrier,
wherein the first substrate is connected to the fixed portion, and the second substrate is connected to the moving portion.

24. A camera module comprising:
the actuator for a camera of claim 20; and
a lens module coupled to the housing and fixed relative to the housing.

25. A portable electronic device comprising:
a camera module comprising:
the actuator for a camera of claim 20; and
a lens module coupled to the housing.

26. An actuator for a camera comprising:
a first carrier movable perpendicular to an optical axis;
a second carrier disposed in the first carrier and movable in the optical axis direction relative to the first carrier; and
an image sensor disposed on the second carrier,
wherein the second carrier and the image sensor move with the first carrier when the first carrier moves, and
wherein the image sensor moves with the second carrier when the second carrier moves in the optical axis direction.

27. The actuator for a camera of claim 26, further comprising:
a first driver comprising first magnets facing first coils and second magnets facing second coils,
wherein the first magnets face the first coils and the second magnets face the second coils in the optical axis direction or in a direction perpendicular to the optical axis direction.

28. The actuator for a camera of claim 27, further comprising:
a housing;
a pulling magnet disposed on the first carrier; and
a first yoke disposed on the housing,
wherein the first carrier is disposed in the housing, and
wherein attractive force acts between the first yoke and the pulling magnet in the optical axis direction.

29. The actuator for a camera of claim 28, further comprising:
a first ball member disposed between the housing and the first carrier,
wherein a guide groove on which the first ball member is disposed is provided on at least one of surfaces of the housing and the first carrier facing each other in the optical axis direction, and
wherein the attractive force maintains contact of the first ball member with the housing and the first carrier.

30. A camera module comprising:
a housing;
the actuator for a camera of claim 26 disposed in the housing; and
a lens module coupled to the housing and fixed relative to the housing,
wherein the first carrier and the second carrier are movable relative to the housing.

31. A portable electronic device comprising:
a camera module comprising:
a housing;
the actuator for a camera of claim 26 disposed in the housing; and
a lens module coupled to the housing,
wherein the first carrier and the second carrier are movable relative to the housing.

* * * * *